(12) United States Patent
Yang et al.

(10) Patent No.: US 12,470,333 B2
(45) Date of Patent: Nov. 11, 2025

(54) PHYSICAL UPLINK CONTROL CHANNEL CARRIER SWITCH WITH MULTIPLE HYBRID AUTOMATIC REPEAT REQUEST ACKNOWLEDGEMENT CODEBOOKS

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 18/055,963

(22) Filed: Nov. 16, 2022

(65) Prior Publication Data
US 2023/0155749 A1    May 18, 2023

Related U.S. Application Data

(60) Provisional application No. 63/264,279, filed on Nov. 18, 2021.

(51) Int. Cl.
*H04L 1/1867* (2023.01)

(52) U.S. Cl.
CPC .................... *H04L 1/1887* (2013.01)

(58) Field of Classification Search
CPC .... H04L 1/1887; H04L 1/1896; H04L 1/1861
See application file for complete search history.

(56) References Cited

U.S. PATENT DOCUMENTS

| | | | |
|---|---|---|---|
| 2021/0250134 A1 | 8/2021 | Islam et al. | |
| 2022/0329391 A1* | 10/2022 | Bae | H04L 1/1864 |
| 2023/0379095 A1* | 11/2023 | Kittichokechai | H04L 5/0098 |

OTHER PUBLICATIONS

Interdigital Inc: "HARQ Feedback Enhancements for IIoT and URLLC", 3GPP TSG RAN WG1 #105-e, R1-2105399, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 3 Pages, XP052006347, p. 1-2.
International Search Report and Written Opinion—PCT/US2022/080056—ISA/EPO—Feb. 23, 2023.

* cited by examiner

*Primary Examiner* — Shawn D Miller
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a first hybrid automatic repeat request acknowledgement (HARQ-ACK) codebook and a second HARQ-ACK codebook, wherein the configuration indicates that physical uplink control channel (PUCCH) carrier switching is enabled for at least one of the first HARQ-ACK codebook or the second HARQ-ACK codebook. The UE may receive an indication of a PUCCH carrier switch for the at least one of the first HARQ-ACK codebook or the second HARQ-ACK codebook. The UE may receive a downlink communication associated with the at least one of the first HARQ-ACK codebook or the second HARQ-ACK codebook. The UE may transmit HARQ feedback a target PUCCH carrier based at least in part on the indication of the PUCCH carrier switch. Numerous other aspects are described.

30 Claims, 13 Drawing Sheets

PHYSICAL UPLINK CONTROL CHANNEL CARRIER SWITCH WITH MULTIPLE HYBRID AUTOMATIC REPEAT REQUEST ACKNOWLEDGEMENT CODEBOOKS

CROSS-REFERENCE TO RELATED APPLICATION

This Patent application claims priority to U.S. Provisional Patent Application No. 63/264,279, filed on Nov. 18, 2021, titled "PHYSICAL UPLINK CONTROL CHANNEL CARRIER SWITCH WITH MULTIPLE HYBRID AUTOMATIC REPEAT REQUEST ACKNOWLEDGEMENT CODEBOOKS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical uplink control channel (PUCCH) carrier switch with multiple hybrid automatic repeat request acknowledgement (HARQ-ACK) codebooks.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a configuration of a first hybrid automatic repeat request acknowledgement (HARQ-ACK) codebook and a second HARQ-ACK codebook, wherein the configuration indicates that physical uplink control channel (PUCCH) carrier switching is enabled for at least one of the first HARQ-ACK codebook or the second HARQ-ACK codebook. The one or more processors may be configured to receive an indication of a PUCCH carrier switch for the at least one of the first HARQ-ACK codebook or the second HARQ-ACK codebook. The one or more processors may be configured to receive at least one downlink communication associated with the at least one of the first HARQ-ACK codebook or the second HARQ-ACK codebook. The one or more processors may be configured to transmit HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to a base station for wireless communication. The base station may include a memory and one or more processors coupled to the memory. The one or more processors may be configured to transmit, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The one or more processors may be configured to transmit, to the UE, an indication of a PUCCH carrier switch for the at least one of the first HARQ-ACK codebook or the second HARQ-ACK codebook. The one or more processors may be configured to transmit, to the UE, at least one downlink communication associated with the at least one of the first HARQ-ACK codebook or the second HARQ-ACK codebook. The one or more processors may be configured to receive, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to a method of wireless communication performed by a UE. The method may include receiving a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The method may include receiving an indication of a PUCCH carrier switch for the at least one of the first HARQ-ACK codebook or the second HARQ-ACK codebook. The method may include receiving at least one downlink communication associated with the at least one of the first HARQ-ACK codebook or the second HARQ-ACK codebook. The method may include transmitting HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to a method of wireless communication performed by a base station. The method may include transmitting, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The method may include transmitting, to the UE, an indication of a PUCCH carrier switch for the at least one of the first HARQ-ACK codebook or the second HARQ-ACK codebook. The method may include transmitting, to the UE, at least one downlink communication associated with the at least one of the first HARQ-ACK codebook or the second HARQ-ACK codebook. The method may include receiving, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to a non-transitory computer-readable medium that stores a set of instructions for wireless communication by a UE. The set of instructions, when executed by one or more processors of the UE, may cause the UE to receive a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The set of instructions, when executed by one or more processors of the UE, may cause the UE to receive an indication of a PUCCH carrier switch for the at least one of the first HARQ-ACK codebook or the second HARQ-ACK codebook. The set of instructions, when executed by one or more processors of the UE, may cause the UE to receive at least one downlink communication associated with the at least one of the first HARQ-ACK codebook or the second HARQ-ACK codebook. The set of instructions, when executed by one or more processors of the UE, may cause the UE to transmit HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to a non-transitory computer-readable medium that stores a set of instructions for wireless communication by a base station. The set of instructions, when executed by one or more processors of the base station, may cause the base station to transmit, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The set of instructions, when executed by one or more processors of the base station, may cause the base station to transmit, to the UE, an indication of a PUCCH carrier switch for the at least one of the first HARQ-ACK codebook or the second HARQ-ACK codebook. The set of instructions, when executed by one or more processors of the base station, may cause the base station to transmit, to the UE, at least one downlink communication associated with the at least one of the first HARQ-ACK codebook or the second HARQ-ACK codebook. The set of instructions, when executed by one or more processors of the base station, may cause the base station to receive, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to an apparatus for wireless communication. The apparatus may include means for receiving a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The apparatus may include means for receiving an indication of a PUCCH carrier switch for the at least one of the first HARQ-ACK codebook or the second HARQ-ACK codebook. The apparatus may include means for receiving at least one downlink communication associated with the at least one of the first HARQ-ACK codebook or the second HARQ-ACK codebook. The apparatus may include means for transmitting HARQ feedback for the at least one downlink communication in the at least one of the first HARQ-ACK codebook or the second HARQ-ACK codebook on a target PUCCH carrier based at least in part on the indication of the PUCCH carrier switch.

Some aspects described herein relate to an apparatus for wireless communication. The apparatus may include means for transmitting, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The apparatus may include means for transmitting, to the UE, an indication of a PUCCH carrier switch for the at least one of the first HARQ-ACK codebook or the second HARQ-ACK codebook. The apparatus may include means for transmitting, to the UE, at least one downlink communication associated with the at least one of the first HARQ-ACK codebook or the second HARQ-ACK codebook. The apparatus may include means for receiving, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
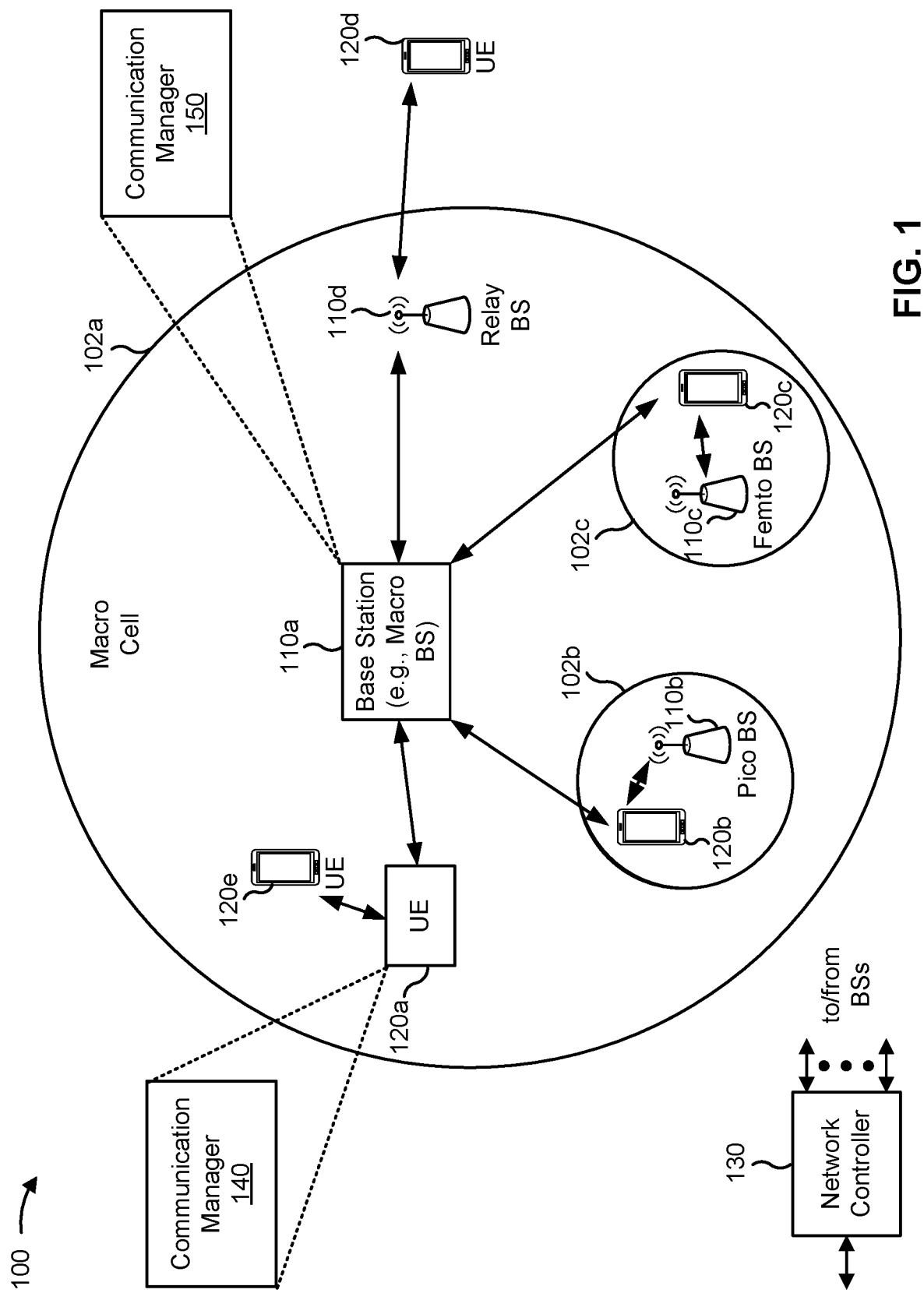
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a first hybrid automatic repeat request (HARQ) acknowledgement (HARQ-ACK) codebook and a second HARQ-ACK codebook, wherein the configuration indicates that physical uplink control channel (PUCCH) carrier switching is enabled for at least one of the first HARQ-ACK codebook or the second HARQ-ACK codebook; receive an indication of a PUCCH carrier switch for the at least one of the first HARQ-ACK codebook or the second HARQ-ACK codebook; receive at least one downlink communication associated with the at least one of the first HARQ-ACK codebook or the second HARQ-ACK codebook; and transmit HARQ feedback for the at least one downlink communication in the at least one of the first HARQ-ACK codebook or the second HARQ-ACK codebook on a target PUCCH carrier based at least in part on the indication of the PUCCH carrier switch. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook; transmit, to the UE, an indication of a PUCCH carrier switch for the at least one of the first HARQ-ACK codebook or the second HARQ-ACK codebook; transmit, to the UE, at least one downlink communication associated with the at least one of the first HARQ-ACK codebook or the second HARQ-ACK codebook; and receive, from the UE, HARQ feedback for the at least one downlink communication in the at least one of the first HARQ-ACK codebook or the second HARQ-ACK codebook on a target PUCCH carrier based at least in part on the indication of the PUCCH carrier switch. Additionally, or alternatively, the communication manager 150 may perform one or more other operations described herein.

As indicated above, FIG. 1 is provided as an example. Other examples may differ from what is described with regard to FIG. 1.

Figure 2:
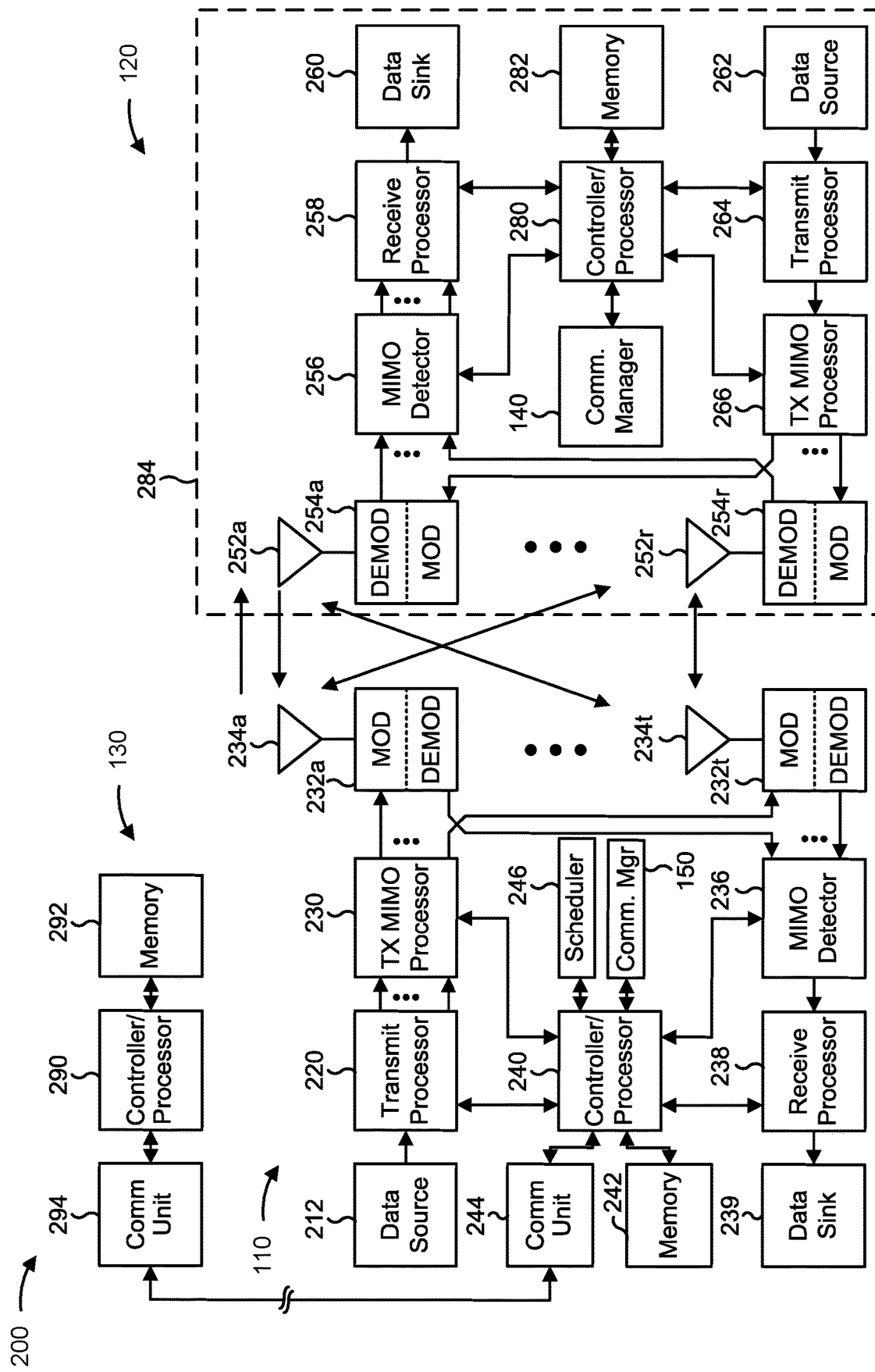
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the base station 110, the controller/processor 280 of the UE 120, and/or any other component(s) of FIG. 2 may perform one or more techniques associated with PUCCH carrier switch with multiple HARQ-ACK codebooks, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook; means for receiving an indication of a PUCCH carrier switch for the at least one of the first HARQ-ACK codebook or the second HARQ-ACK codebook; means for receiving at least one downlink communication associated with the at least one of the first HARQ-ACK codebook or the second HARQ-ACK codebook; and/or means for transmitting HARQ feedback for the at least one downlink communication in the at least one of the first HARQ-ACK codebook or the second HARQ-ACK codebook on a target PUCCH carrier based at least in part on the indication of the PUCCH carrier switch. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook; means for transmitting, to the UE, an indication of a PUCCH carrier switch for the at least one of the first HARQ-ACK codebook or the second HARQ-ACK codebook; means for transmitting, to the UE, at least one downlink communication associated with the at least one of the first HARQ-ACK codebook or the second HARQ-ACK codebook; and/or means for receiving, from the UE, HARQ feedback for the at least one downlink communication in the at least one of the first HARQ-ACK codebook or the second HARQ-ACK codebook on a target PUCCH carrier based at least in part on the indication of the PUCCH carrier switch. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
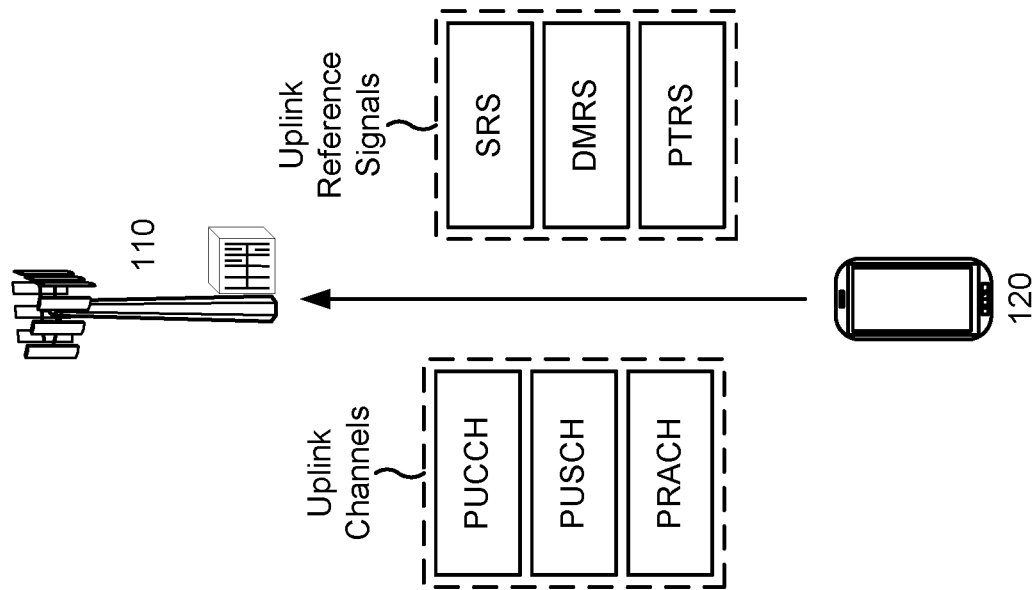
FIG. 3 is a diagram illustrating an example of physical channels and reference signals in a wireless network, in accordance with the present disclosure.
Figure 3:
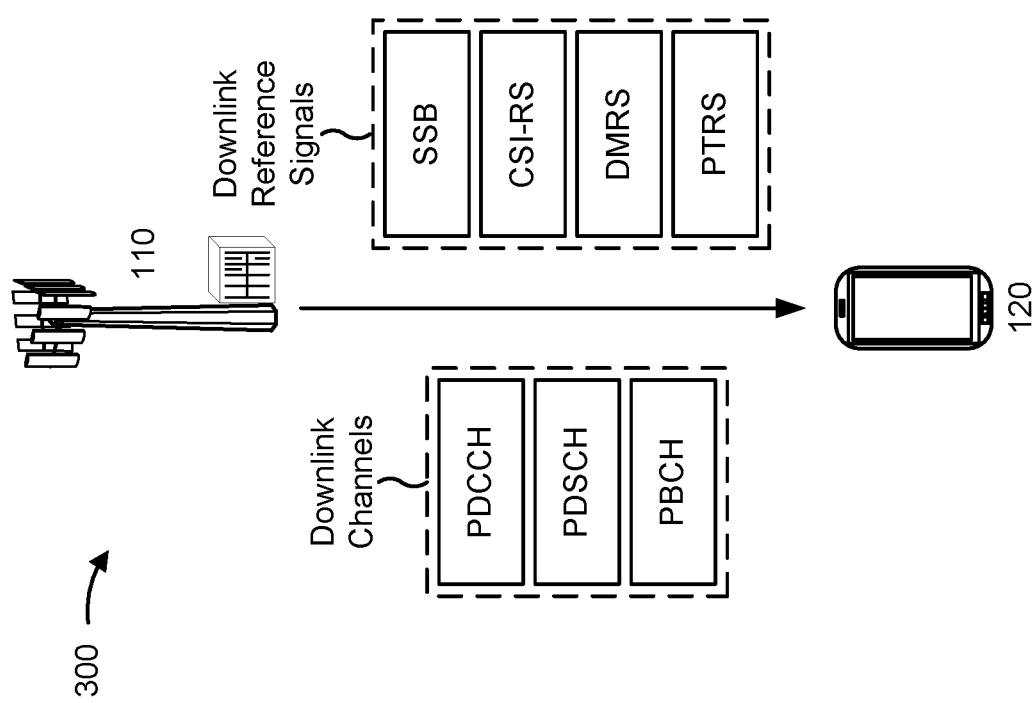

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH. For example, the UE 120 may transmit a HARQ-ACK in UCI on a PUCCH or a PUSCH. In some cases, PUCCHs may be grouped into a set of PUCCH groups. For example, a base station 110 may provide a plurality of serving cells or component carriers on a plurality of frequency bands (e.g., FR1 or FR2) and associate different cells with different PUCCHs and different PUCCH groups. "PUCCH group" refers to a group of component carriers or serving cells that share a same PUCCH carrier for transmitting PUCCH. As used herein, "component carrier" (or "carrier") and "serving cell" or "cell" may be used interchangeably. A PUCCH group may include a primary cell (PCell) and one or more secondary cells (SCells). For example, a PUCCH group may be a master cell group (MCG) that includes serving cells (e.g., a PCell and one or more SCells) for communications between a UE 120 and a master node (e.g., a first base station 110) or a secondary cell group (SCG) that includes serving cells (e.g., a PCell and one or more SCells) for communications between a UE 120 and a secondary node (e.g., a second base station 110). The PCell of an SCG may be referred to as a primary secondary cell (PSCell).

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs.

Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
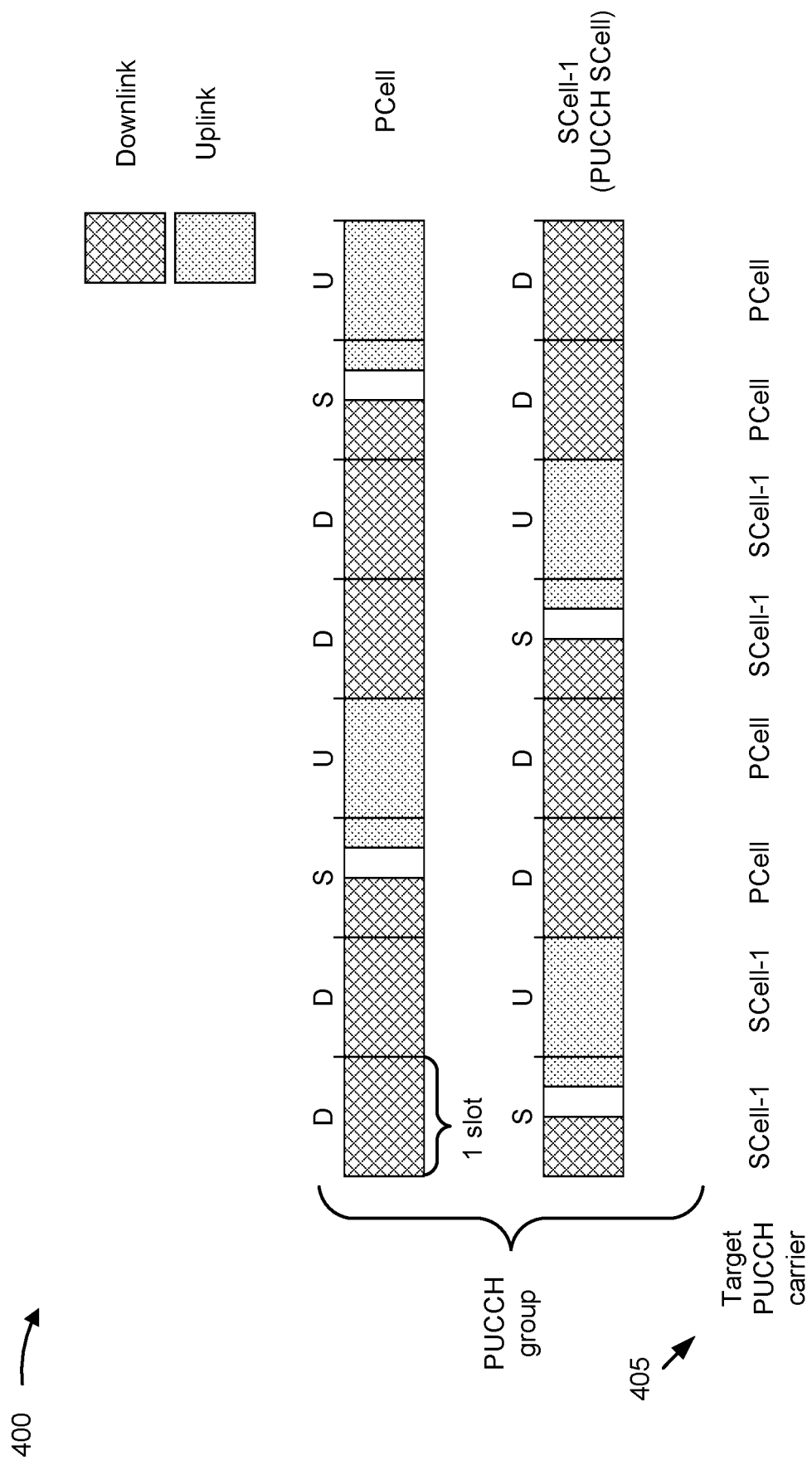
FIG. 4 is a diagram illustrating an example of a semi-static indication of a physical uplink control channel (PUCCH) carrier switch in a PUCCH group, in accordance with the present disclosure.

FIG. 4 is a diagram illustrating an example 400 of a semi-static indication of a PUCCH carrier switch in a PUCCH group, in accordance with the present disclosure.

In some cases (e.g., in NR Release 15 and NR Release 16), a PUCCH group may have only one carrier/cell that can be used by a UE to transmit PUCCH. In this case, the UE may use the PCell in an MCG or the PSCell in an SCG for transmitting PUCCH.

In some examples (e.g., in NR Release 17), a PUCCH carrier switch feature may be introduced, in which multiple carriers/cells in a PUCCH group may be used to transmit PUCCH. For example, in some cases, a UE may use at most two uplink cells in a PUCCH group to transmit PUCCH. In this case, the UE may use the PCell (or PSCell in an SCG) and an SCell for transmitting PUCCH. The SCell that can be used by the UE to transmit PUCCH may be referred to as the PUCCH SCell. Hereinafter, "PCell," "primary cell," or "primary component carrier (PCC)" may refer to the PCell in an MCG or the PSCell in an SCG.

In a case in which PUCCH carrier switching is enabled for a UE, the UE may switch between using the PCell and the PUCCH SCell for PUCCH transmissions. As shown in FIG. 4, in some aspects, the UE may perform the PUCCH carrier switching based at least in part on a semi-static indication of the PUCCH carrier switch. A base station may transmit (e.g., via a radio resource control (RRC) message) the semi-static indication of the PUCCH carrier switch to the UE. The semi-static indication may include a configuration of a periodic time pattern that indicates a target PUCCH carrier (e.g., a target cell in which to transmit PUCCH) for each slot of a set of slots within a time period. As shown in FIG. 4, a PUCCH group configured for a UE may include a PCell (e.g., PCC), on which the UE is permitted to transmit PUCCH, and a first SCell (SCell-1) configured as a PUCCH SCell on which the UE is permitted to transmit PUCCH. The PCell and the SCell-1 may have different time domain duplex (TDD) configurations including downlink slots (D), uplink slots (U), and special slots(S), in which the UE switches from downlink reception to uplink transmission. The PUCCH group may also include one or more other SCells (e.g., secondary component carriers (SCCs)). As shown by reference number 405, the time pattern configured in the semi-static indication of the PUCCH switch may indicate which of the PCC or the $SCC_{-1}$ is the target PUCCH carrier for each slot of the set of slots. For example, in FIG. 4, the time pattern for the set of slots may be [SCell-1, SCell-1, PCell, PCell, SCell-1, SCell-1, PCell, PCell], and this time pattern may be repeated over time.

The time pattern may be configured with reference to the PCell numerology (e.g., in case the PCell and PUCCH SCell are configured with different numerologies, such as different slot durations). The UE may determine a slot in which to transmit a HARQ-ACK for a downlink communication (e.g., a PDSCH communication) received by the UE in accordance with a K1 value. The K1 value is a PDSCH-to-HARQ-ACK offset that indicates a time offset between a slot (or symbol) in which a PDSCH communication (e.g., a dynamically scheduled or semi-persistent scheduling (SPS)

PDSCH communication) is transmitted and a slot (or symbol) in which the HARQ-ACK for the PDSCH communication is transmitted. For semi-statically indicated PUCCH carrier switching, the UE may interpret the K1 value in accordance with the numerology of the PCell (e.g., in case the PCell and PUCCH SCell are configured with different numerologies). The UE may determine the target PUCCH carrier (e.g., the PCell or SCell-1) in accordance with the configured time pattern. The UE may select a PUCCH resource for transmitting the HARQ-ACK from the PUCCH resources configured in the target PUCCH carrier. For example, the UE may interpret a PUCCH resource indicator (PRI) according to the PUCCH resources configured on the target PUCCH carrier.

As indicated above, FIG. 4 is provided as an example. Other examples may differ from what is described with respect to FIG. 4.

Figure 5:
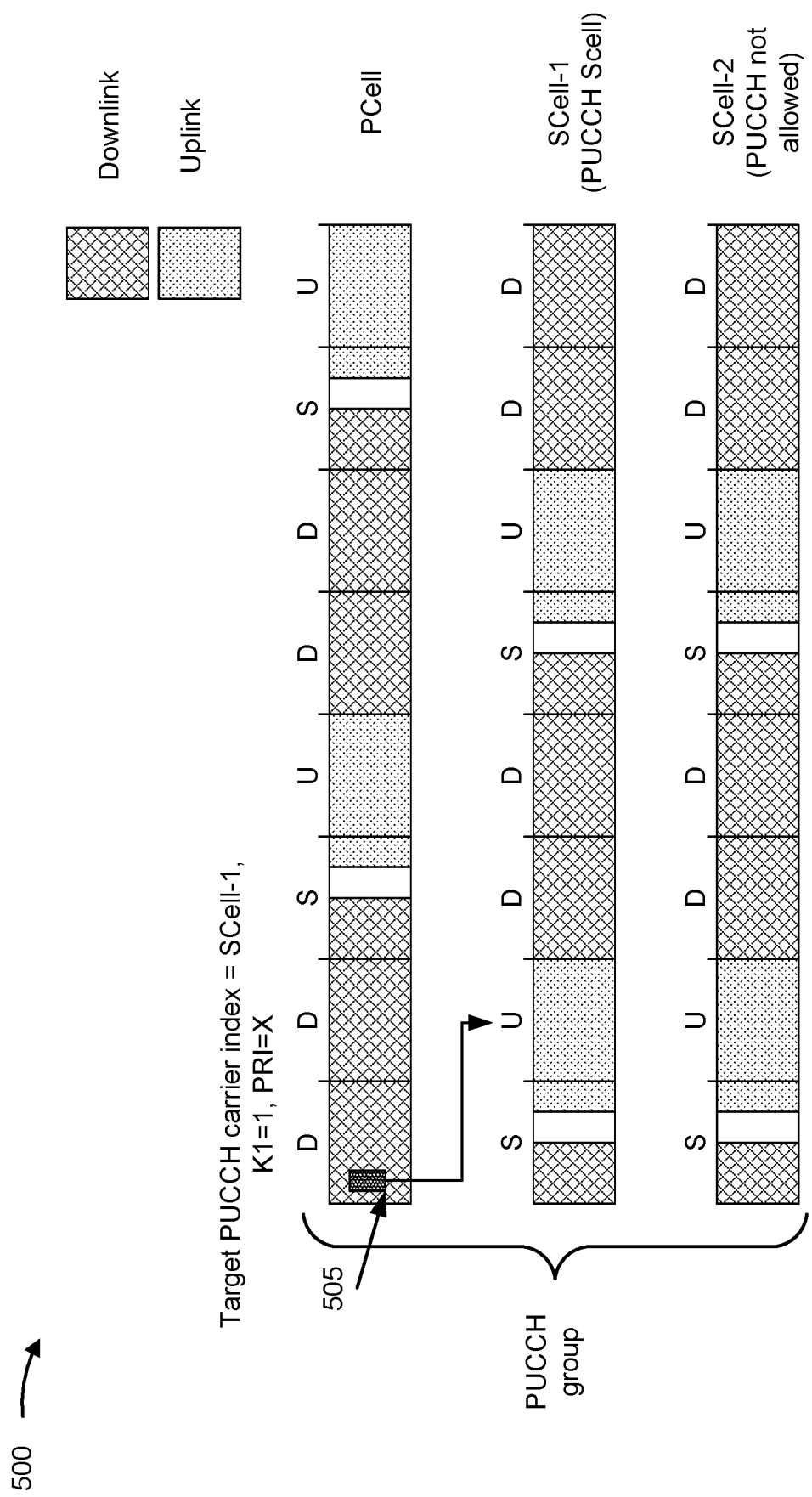
FIG. 5 is a diagram illustrating an example of a dynamic indication of a PUCCH carrier switch in a PUCCH group, in accordance with the present disclosure.

FIG. 5 is a diagram illustrating an example 500 of a dynamic indication of a PUCCH carrier switch in a PUCCH group, in accordance with the present disclosure.

As shown in FIG. 5, in some aspects, a UE may perform PUCCH carrier switching based at least in part on a dynamic indication of the PUCCH carrier switch. A base station may include the dynamic indication of the PUCCH carrier switch in DCI that schedules a downlink communication (e.g., PDSCH communication) to the UE. The dynamic indication may be a one bit indication, in the DCI, that indicates the target PUCCH carrier for PUCCH transmission. For example, the dynamic indication may be a one bit target PUCCH carrier index that indicates a selection between the PCell and the PUCCH SCell configured for the UE.

As shown in FIG. 5, a PUCCH group configured for a UE may include a PCell (e.g., PCC), on which the UE is permitted to transmit PUCCH, a first SCell (SCell-1) configured as a PUCCH SCell on which the UE is permitted to transmit PUCCH, and a second SCell (SCell-2) that is not configured for PUCCH transmission. The PUCCH group may also include one or more other SCells (e.g., SCCs). As shown by reference number 505, the UE may receive DCI that schedules a PDSCH communication and includes a target PUCCH carrier index that indicates the target PUCCH carrier cell for the UE to use to transmit the PUCCH communication including the HARQ-ACK for the PDSCH communication. For example, as shown in FIG. 5, the target PUCCH carrier index may indicate that the target PUCCH carrier is the SCell-1. The DCI may also indicate the K1 value, and the UE may determine the slot for the transmitting the HARQ-ACK on the target PUCCH carrier in accordance with the K1 value (e.g., K1=1 slot in FIG. 5). For the dynamically indicated PUCCH carrier switching, the UE may interpret the K1 value in accordance with the numerology of the indicated target PUCCH carrier. The DCI may also include a PRI (e.g., PRI=X) that indicates a PUCCH resource to use to transmit the HARQ-ACK, and the UE may interpret the PRI according to the PUCCH resources configured on the indicated target PUCCH carrier. In this way, the UE may select a PUCCH resource, from the PUCCH resources configured on the target PUCCH carrier, to use to transmit the HARQ-ACK for the PDSCH communication.

As indicated above, FIG. 5 is provided as an example. Other examples may differ from what is described with respect to FIG. 5.

Figure 6:
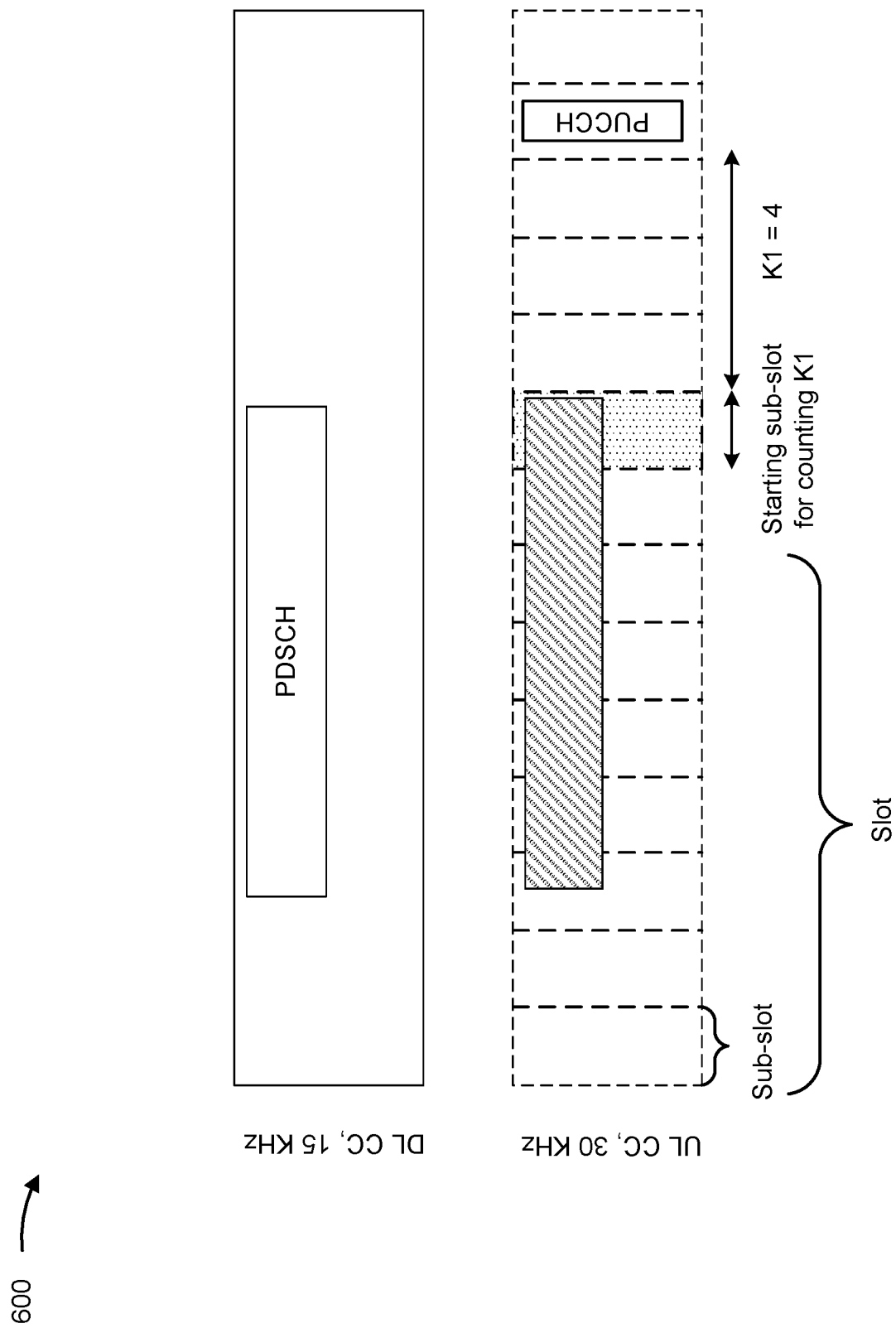
FIG. 6 is a diagram illustrating an example of a sub-slot based PUCCH transmission, in accordance with the present disclosure.

FIG. 6 is a diagram illustrating an example 600 of a sub-slot based PUCCH transmission, in accordance with the present disclosure.

In some cases, a UE may be configured to perform sub-slot based PUCCH transmissions. Sub-slot based PUCCH transmissions provide a benefit of allowing multiple HARQ-ACK transmissions per slot. In some examples, the UE may be configured with a sub-slot length parameter (e.g., subslotLength-ForPUCCH), which indicates a length of a sub-slot for PUCCH transmissions. In a case in which the UE is configured with the sub-slot length parameter (e.g., subslotLength-ForPUCCH), the UE may transmit PUCCH communications (e.g., HARQ-ACKs) in sub-slots, each including a number of symbols indicated by the subslotLength-ForPUCCH parameter. For example, in a first sub-slot configuration (e.g., sub-slot length=7), each slot may include 2 sub-slots in which PUCCH may be transmitted, each with 7 symbols. In a second sub-slot configuration (e.g., sub-slot length=2), each slot may include 7 sub-slots in which PUCCH may be transmitted, each with 2 symbols. In a case in which the UE is configured with sub-slots (e.g., the UE is configured with the sub-slot length parameter), the PUCCH transmission by the UE may be contained within a sub-slot and may not be able to cross a sub-slot boundary. In a case in which the UE is not configured with the sub-slot length parameter (e.g., subslotLength-ForPUCCH), the UE may be configured for slot based PUCCH transmission.

As shown in FIG. 6, a UE may receive a PDSCH communication on a downlink component carrier (DL CC) in a PUCCH group, and the UE may transmit a PUCCH communication including a HARQ-ACK for the PDSCH communication on an uplink component carrier (UL CC). In some examples, the downlink component carrier and the uplink component carrier may have a different numerologies. For example, as shown in FIG. 6, the downlink component carrier may have a subcarrier spacing (SCS) of 15 kHz, and the uplink component carrier may have a SCS of 30 kHz. The HARQ-ACK may be associated with a HARQ codebook configured for the UE, and the HARQ codebook may be configured for sub-slot based PUCCH transmission (e.g., the configuration of the HARQ codebook may include the sub-slot length parameter). As shown in FIG. 6, the sub-slot length configured for the HARQ codebook may be 2 symbols, and each slot for the uplink component carrier may include 7 sub-slots, each with 2 symbols. The UE may determine the sub-slot in which to transmit the PUCCH including the HARQ-ACK for the PDSCH communication in accordance with the K1 value associated with the PDSCH communication. The granularity of the K1 value may be the same as the sub-slot length configured for the HARQ-ACK codebook, such that the K1 value indicates a number of sub-slots (in the numerology of the PUCCH cell) by which the HARQ-ACK/PUCCH transmission is offset from the PDSCH communication. The K1 counting, by the UE, may start from a beginning of the uplink sub-slot that includes an ending symbol of the PDSCH communication. For example, as shown in FIG. 6, K1=4 indicates that the UE is to transmit the PUSCH including the HARQ-ACK in the fourth sub-slot after the uplink sub-slot that includes the ending symbol of the PDSCH communication.

As indicated above, FIG. 6 is provided as an example. Other examples may differ from what is described with respect to FIG. 6.

Figure 7:
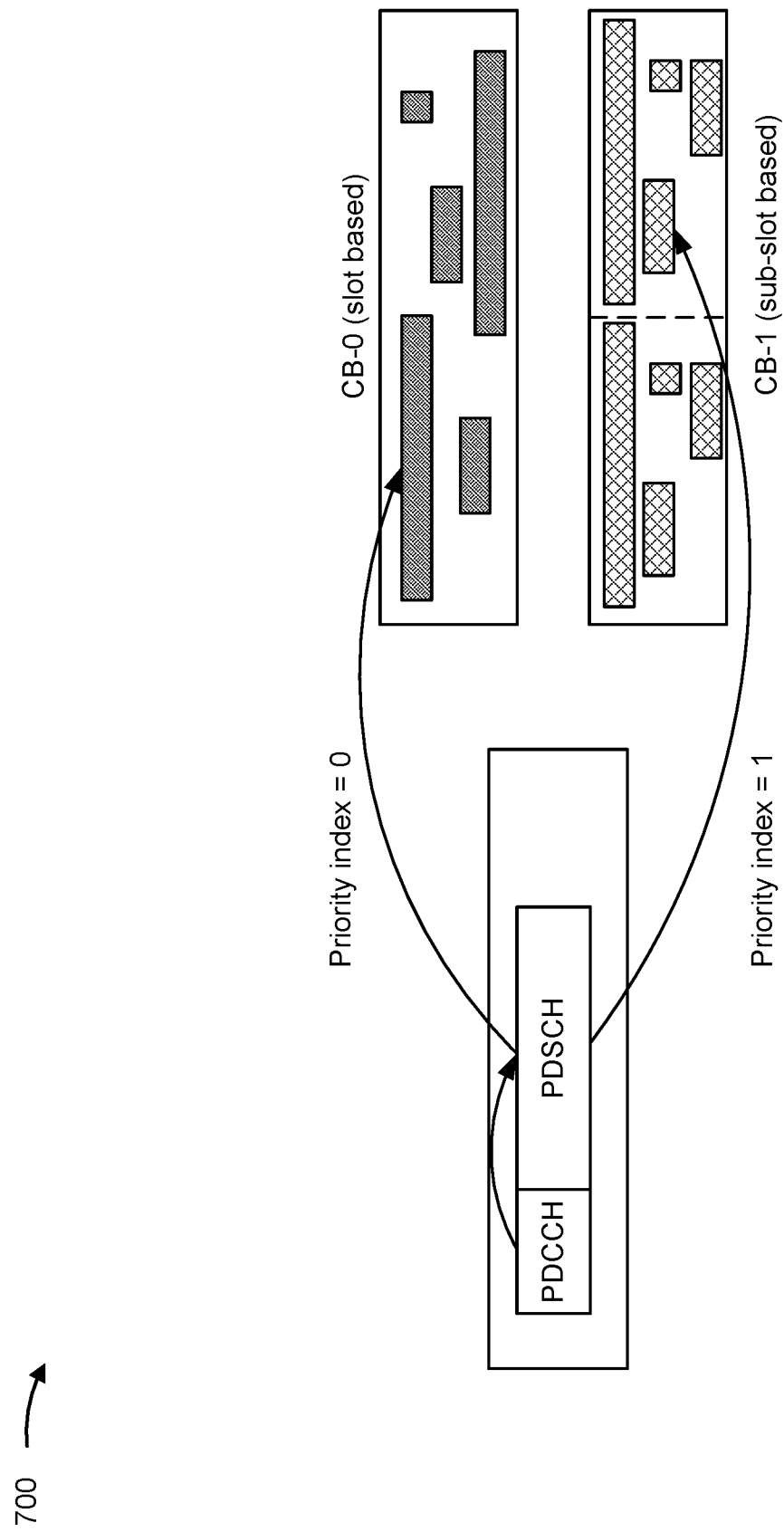
FIG. 7 is a diagram illustrating an example of multiple hybrid automated repeat request (HARQ) acknowledgment (HARQ-ACK) codebooks configured for a UE, in accordance with the present disclosure.

FIG. 7 is a diagram illustrating an example 700 of multiple HARQ-ACK codebooks configured for a UE, in accordance with the present disclosure.

In some cases, a UE may be configured with multiple HARQ-ACK codebooks. As shown in FIG. 7, a UE may be configured with a first HARQ-ACK codebook (CB-0) and a second HARQ-ACK codebook (CB-1). The CB-0 may be associated with a first priority, and the CB-1 may be associated with a second priority. For example, the first priority may be a low priority, such as a priority associated with enhanced mobile broadband (eMBB) traffic, and the second priority may be a high priority, such as a priority associated with ultra-reliable low latency (URLLC) traffic. In some examples, the low priority may be associated with a priority index of 0, and the high priority may be associated with a priority index of 1.

PUCCH resources for CB-0 and CB-1 may be configured separately. In some examples, one HARQ-ACK codebook configured for a UE may be slot-based and another HARQ-ACK codebook configured for the UE may be sub-slot based. For example, as shown in FIG. 7, CB-0 is slot based, and CB-1 is sub-slot based. In other examples, both HARQ-ACK codebooks may be slot based or both HARQ-ACK codebooks may be sub-slot based. A configuration for a slot based HARQ-ACK codebook (e.g., CB-0 in FIG. 7) may identify PUCCH resources (e.g., time and frequency resources) in a slot that can be used for slot based transmission of the HARQ-ACK codebook. A configuration for a sub-slot based HARQ-ACK codebook (e.g., CB-1 in FIG. 7) may identify PUCCH resources in sub-slots for a sub-slot based transmission of the HARQ-ACK codebook. In this case, the PUCCH resources configured for the sub-slot based HARQ-ACK codebook (e.g., CB-1) may all be contained within the boundaries defined by the sub-slots.

As shown in FIG. 7, a base station may transmit, to a UE, a PDCCH communication including DCI that schedules a PDSCH communication. The DCI (e.g., DCI format 1_1 (DCI 1_1) or DCI format 1_2 (DCI 1_2)) may include a priority indicator field that indicates a priority associated with the PDSCH communication. For example, the priority indicator field may indicate a first priority index (priority index=0) associated with a first priority or a second priority index (priority index=1) associated with a second priority. The priority indicator field may also indicate, to the UE, which HARQ-ACK codebook to use for reporting the HARQ-ACK for the PDSCH communication. For example, the UE may use CB-0 for transmitting the HARQ-ACK in connection with the priority indicator field indicating the first priority index (e.g., priority index=0), and the UE may use CB-1 for transmitting the HARQ-ACK in connection with the priority indicator field indicating the second priority index (e.g., priority index=1).

As indicated above, FIG. 7 is provided as an example. Other examples may differ from what is described with respect to FIG. 7.

As described above, PUCCH carrier switching may allow a UE to use multiple PUCCH carriers (e.g., a PCell and a PUCCH SCell) for transmitting HARQ feedback (e.g., HARQ-ACK/NACK) for downlink communications. Such PUCCH carrier switching may reduce latency and increase reliability of HARQ feedback transmissions. However, there is currently no mechanism for a UE that is configured with multiple HARQ-ACK codebooks to perform PUCCH carrier switching. Accordingly, in a case in which the UE is configured with multiple HARQ-ACK codebooks, there may be confusion between the UE and the base station as to how to perform PUCCH carrier switching, for example, because the UE may not know to which of the HARQ-ACK an indication of a PUCCH switch applies. In this case, the UE may not be able to perform PUCCH carrier switching because the UE may transmit a PUCCH codebook on a different PUCCH carrier than a PUCCH carrier expected by the base station upon receiving a PUCCH carrier switch indication. As a result, latency may be increased, and/or reliability may be decreased for HARQ-feedback transmissions relative to HARQ-feedback transmissions for which the UE performs PUCCH carrier switching.

Some techniques and apparatuses described herein enable a UE to receive, from a base station, a configuration of a first HARQ-ACK codebook and a second HARQ-ACK codebook. The configuration may indicate that PUCCH carrier switching is enabled for the first HARQ-ACK codebook and/or the second HARQ-ACK codebook. The UE may receive, from the base station, an indication of a PUCCH carrier switch for the first HARQ-ACK codebook and/or the second HARQ-ACK codebook. The UE may receive, from the base station, at least one downlink communication associated with the first HARQ-ACK codebook and/or the second HARQ-ACK codebook. The UE may transmit, to the base station, HARQ feedback for the at least one downlink communication in the first HARQ-ACK codebook and/or the second HARQ-ACK codebook on a target PUCCH carrier based at least in part on the indication of the PUCCH carrier switch. As a result, the UE, which is configured with multiple HARQ-ACK codebooks, may perform PUCCH carrier switching, and confusion between the UE and the base station as how to perform the PUCCH carrier switching may be avoided or reduced because of the indication in the configuration of which of first HARQ-ACK codebook and/ or the second HARQ-ACK codebook are enabled for PUCCH carrier switching. Thus, latency may be reduced, and reliability may be increased for HARQ-feedback transmissions from the UE relative to HARQ feedback transmissions without PUCCH carrier switching.

Figure 8:
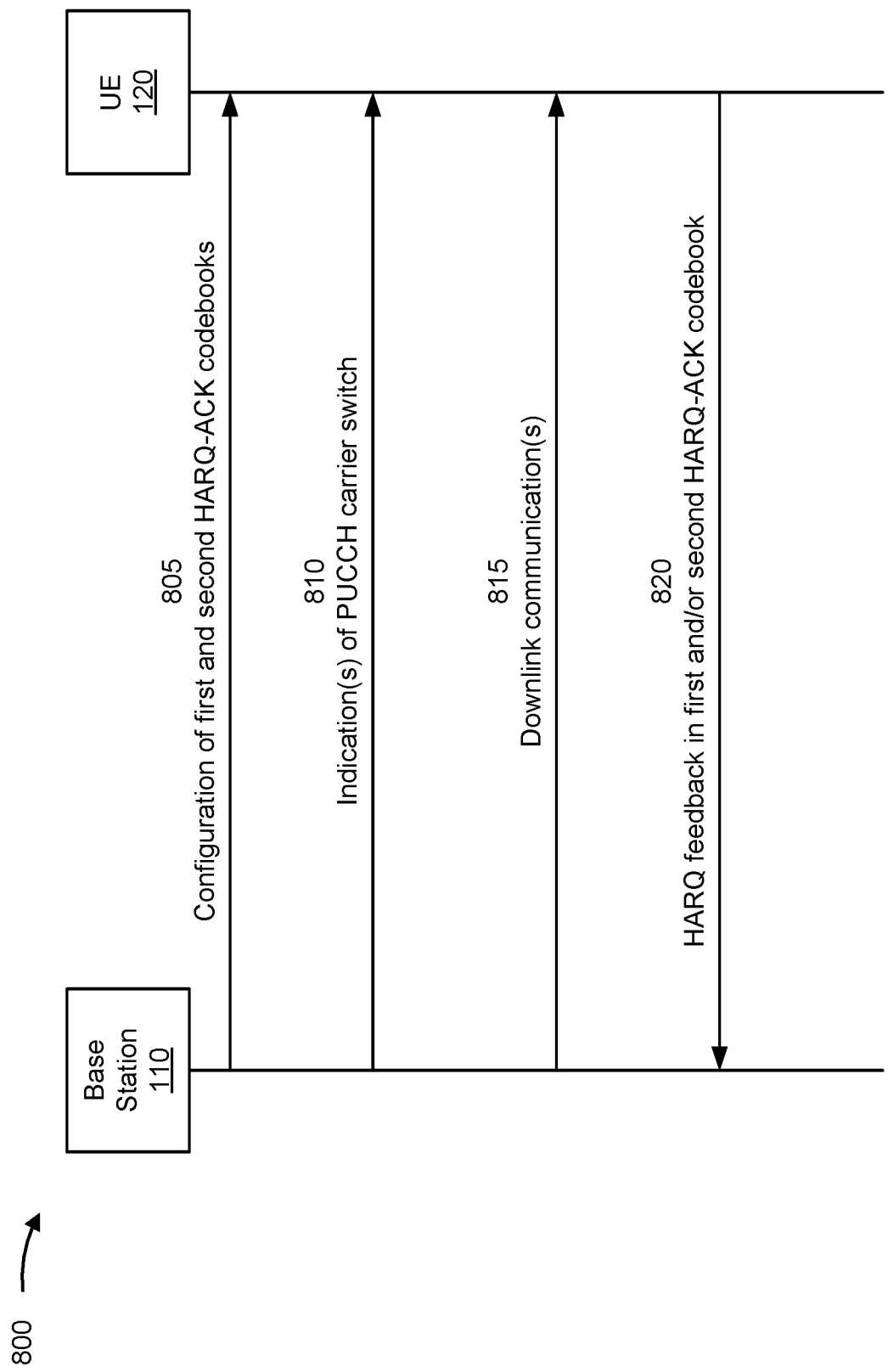
FIGS. 8-9 are diagrams illustrating examples associated with PUCCH carrier switching with multiple HARQ-ACK codebooks, in accordance with the present disclosure.

FIG. 8 is a diagram illustrating an example 800 associated with PUCCH carrier switching with multiple HARQ-ACK codebooks, in accordance with the present disclosure. As shown in FIG. 8, example 800 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 8, and by reference number 805, the base station 110 may transmit, to the UE 120, a configuration of a first HARQ-ACK codebook and a second HARQ-ACK codebook. The UE may receive the configuration of the first HARQ-ACK codebook and the second HARQ-ACK codebook. The configuration may configure the first and second HARQ-ACK codebooks for a PUCCH group configured for the UE. The first HARQ-ACK codebook may be associated with a first priority, and the second HARQ-ACK codebook may be associated with a second priority. In some aspects, the first priority is different than the second priority. For example, the first priority may be a lower priority than the second priority. In some aspects, the first priority may be a higher priority than the second priority. The base station 110 may transmit the configuration of the first and second HARQ-ACK codebooks to the UE 120 in an RRC message.

The configuration of the first and second HARQ-ACK codebooks may indicate whether PUCCH carrier switching is enabled for the first HARQ-ACK codebook and/or the second HARQ-ACK codebook. In some aspects, the configuration may indicate that PUCCH carrier switching is enabled for at least one of the first HARQ-ACK codebook or the second HARQ-ACK codebook. In some aspects, the configuration may indicate that PUCCH carrier switching is enabled for both the first HARQ-ACK codebook and the second HARQ-ACK codebook. In some aspects, the configuration may include an indication of whether PUCCH carrier switching is enabled or disabled that applies jointly to both the first HARQ-ACK codebook and the second HARQ-ACK codebook. For example, the configuration may include a joint indication that PUCCH carrier switching is enabled for both the first HARQ-ACK codebook and the second HARQ-ACK codebook. Alternatively, the configuration may include a joint indication that PUCCH carrier switching is not enabled for either the first HARQ-ACK codebook or the second HARQ-ACK codebook. In some aspects, a joint indication of whether PUCCH carrier switching is enabled or disabled that applies to both of the first and second HARQ-ACK codebooks may reduce signaling overhead, for example, as compared to separate indications for the first and second HARQ-ACK codebooks.

In some aspects, the enabling or disabling of PUCCH carrier switching may be separately configured for first HARQ-ACK codebook and the second HARQ-ACK codebook. For example, the configuration may include a first indication that indicates whether PUCCH carrier switching is enabled for the first HARQ-ACK codebook and a second indication that indicates whether PUCCH carrier switching is enabled for the second HARQ-ACK codebook. In some aspects, separate indications of whether PUCCH carrier switching is enabled or disabled for the first and second HARQ-ACK codebooks may increase flexibility, as compared to a joint indication, to configure the UE 120 with PUCCH carrier switching enabled in either, both, or neither of the first and second HARQ-ACK codebooks which may result in increased reliability. In some aspects, the configuration may indicate that one of the first HARQ-ACK codebook or the second HARQ-ACK codebook supports PUCCH carrier switching (e.g., PUCCH carrier switching is enabled) and the other one of the first HARQ-ACK codebook or the second HARQ-ACK codebook does not support PUCCH carrier switching (e.g., PUCCH carrier switching is disabled). For example, the first indication in the configuration may indicate that PUCCH carrier switching is enabled for the first HARQ-ACK codebook, and the second indication in the configuration may indicate that PUCCH carrier switching is not enabled (e.g., disabled) for the second HARQ-ACK codebook. For example, in a case in which the first priority associated with the first HARQ-ACK codebook is a higher priority than the second priority associated with the second HARQ-ACK codebook, PUCCH carrier switching may be enabled for the first HARQ-ACK codebook and PUCCH carrier switching may be disabled for the second HARQ-ACK codebook. In this case, the second HARQ-ACK (e.g., the HARQ-ACK codebook for which PUCCH carrier switching is disabled) may only be transmitted by the UE 120 over the PCell.

In some aspects, in a case in which two PUCCH cells/carriers (e.g., the PCell and a PUCCH SCell) are configured for the PUCCH group, both of the first and second HARQ-ACK codebooks may be configured for one cell of the two PUCCH cells, and only one of the HARQ-ACK codebooks may be configured for the other cell of the two PUCCH cells. For example, if the configuration indicates that a first PUCCH cell is configured with both the first HARQ-ACK codebook and the second HARQ-ACK codebook and a second PUCCH cell is configured with only the first HARQ-ACK codebook (or only the second HARQ-ACK codebook), then this provides an indication that PUCCH cell switching is only configured for the first HARQ-ACK codebook (or only for the second HARQ-ACK codebook), but not for the other HARQ-ACK codebook. In this case, if a semi-static indication of a PUCCH cell switch is configured, and the second PUCCH cell is indicated by the semi-static indication as the target PUCCH cell/carrier for a slot, only the first HARQ-ACK codebook (or only the second HARQ-ACK codebook) can be scheduled in this slot, but not second HARQ-ACK codebook (or not the first HARQ-ACK codebook), because the second HARQ-ACK codebook (or the first HARQ-ACK codebook) is not configured for the second PUCCH cell.

In some aspects, in a case in which the first PUCCH cell and the second PUCCH cell are configured with different PUCCH configuration parameters (e.g., the first PUCCH cell is configured with both HARQ-ACK codebooks and the second PUCCH cell is configured with only the first HARQ-ACK codebook (or only the second HARQ-ACK codebook)), the size of the DCI (i.e., the size of each field in the DCI) that schedules PUCCH transmissions on the two PUCCH cells may be determined based at least in part on a maximum DCI size (e.g., a maximum field size) associated with the respective PUCCH configurations of the first PUCCH cell and second PUCCH cell. For example, if the first PUCCH cell is configured with both HARQ-ACK codebooks, then the DCI for the first PUCCH cell may be required to include the 1 bit priority indication. If the second PUCCH cell is only configured with one HARQ-ACK codebook, then the DCI that schedules the PUCCH on the second PUCCH cell may not need to include the 1 bit priority indication. However, because the same DCI will be used to indicate PUCCH transmissions in both the PCell (e.g., the first PUCCH cell) and the PUCCH SCell (e.g., the second PUCCH cell), the UE 120 may set up/configure the DCI size such that the DCI includes the 1 bit priority indication (i.e., the maximum between 1 bit and 0 bit).

The configuration may indicate which carriers/cells, of the PUCCH group, may be used by the UE 120 for PUCCH carrier switching. In some aspects, for each HARQ-ACK codebook, the configuration may identify up to two carriers/cells that may be used as target PUCCH carriers. In some aspects, one of the two carriers/cells that may be used as target PUCCH carriers for a HARQ-ACK codebook may be and/or may be required to be the PCell of the PUCCH group. In some aspects, if PUCCH carrier switching is enabled for both the first HARQ-ACK codebook and the second HARQ-ACK codebook, the configuration may identify the same two carriers/cells to be used for the PUCCH carrier switching for the first and second HARQ-ACK codebooks. In some aspects, the same two cells are used for the PUCCH carrier switching for the first and second HARQ-ACK codebooks. In some aspects, the same two cells are required to be used for the PUCCH carrier switching for the first and second HARQ-ACK codebooks. In this case where the configuration may identify the same two carriers/cells to be used for the PUCCH carrier switching for the first and second HARQ-ACK codebooks, a same PUCCH SCell may be configured for both the first HARQ-ACK codebook and the second HARQ-ACK codebook, and there may be at most two cells (e.g., the PCell and the PUCCH SCell) in the PUCCH group that may be used as the target PUCCH carrier for a PUCCH transmission by the UE 120.

In some aspects, if PUCCH carrier switching is enabled for both the first HARQ-ACK codebook and the second HARQ-ACK codebook, configuration may identify different PUCCH SCells for the first HARQ-ACK codebook and the second HARQ-ACK codebook. For example, the target PUCCH carrier for transmitting the first HARQ-ACK codebook may be the PCell of the PUCCH group or a first SCell of the PUCCH group, and the target PUCCH carrier for transmitting the second HARQ-ACK codebook may be the PCell of the PUCCH group or a second SCell of the PUCCH group. In this case, within the PUCCH group, there may be at most three cells (e.g., the PCell, the first SCell, and the second SCell) that may be used as the target PUCCH carrier, and at most two cells that may be used as the target PUCCH for each priority (e.g., for each HARQ-ACK codebook).

The configuration may identify, for each HARQ-ACK codebook, PUCCH resources on each carrier/cell that may be used as the target PUCCH carrier for that HARQ-ACK codebook. In some aspects, the first HARQ-ACK codebook may be slot based (e.g., configured with slot based PUCCH resources) or sub-slot based (e.g., configured with a sub-slot length parameter and sub-slot based PUCCH resources). In some aspects, the second HARQ-ACK codebook may be slot based (e.g., configured with slot based PUCCH resources) or sub-slot based (e.g., configured with a sub-slot length parameter and sub-slot based PUCCH resources).

In some aspects, the UE 120 may not expect that PUCCH carrier switching is enabled for both the first and second HARQ-ACK codebooks when both the first and second HARQ-ACK codebooks are sub-slot based, but with different sub-slot lengths (e.g., subslotLength-ForPUCCH). In this case, the UE 120 may detect an error condition in connection with the configuration indicating that PUCCH carrier switching is enabled for both the first and second HARQ-ACK codebooks, and the first and second HARQ-ACK codebooks being configured as sub-slot based HARQ-ACK codebooks with different sub-slot lengths. In some aspects, the base station 110 may refrain from configuring the first and second HARQ-ACK codebooks with different sub-slot lengths when PUCCH carrier switching is enabled for both HARQ-ACK codebooks. For example, the base station 110 may, and/or be required to, configure the first and second HARQ-ACK codebooks with the same sub-slot length in a case in which the first and second HARQ-ACK codebooks are both sub-slot based and PUCCH carrier switching is enabled for both HARQ-ACK codebooks.

In some aspects, the UE 120 may not expect that PUCCH carrier switching is enabled for both the first and second HARQ-ACK codebooks when one of the first HARQ-ACK codebook or the second HARQ-ACK codebook is configured as slot based and the other one of the first HARQ-ACK codebook and the second HARQ-ACK codebook is configured as sub-slot based. In this case, the UE 120 may detect an error condition in connection with the configuration indicating that PUCCH carrier switching is enabled for a slot based HARQ-ACK codebook and a sub-slot based HARQ-ACK codebook associated with the same PUCCH group. In some aspects, the base station 110 may refrain from configuring the first and second HARQ-ACK codebooks with different slot or sub-slot configurations when PUCCH carrier switching is enabled for both of the HARQ-ACK codebooks. For example, the base station 110 may, and/or be required to, configure the first and second HARQ-ACK codebooks to be both slot based or both sub-slot based in a case in which PUCCH carrier switching is enabled for both of the HARQ-ACK codebooks.

As further shown in FIG. 8, and by reference number 810, the base station 110 may transmit, to the UE 120, at least one indication of a PUCCH carrier switch for at least one of the first HARQ-ACK codebook or the second HARQ-ACK codebook. The UE 120 may receive the at least one indication of the PUCCH carrier switch.

In some aspects, the at least one indication of the PUCCH carrier switch may include at least one semi-static indication of the PUCCH carrier switch. For example, the base station 110 may transmit the at least one semi-static indication of the PUCCH carrier switch to the UE 120 in an RRC message. In this case, the at least one semi-static indication may be included in a same RRC message as the configuration of the first and second HARQ-ACK codebooks or in one or more different RRC messages from the configuration of the first and second HARQ-ACK codebooks.

In some aspects, in a case in which PUCCH carrier switching is enabled for both the first HARQ-ACK codebook and the second HARQ-ACK codebook, the base station 110 may transmit, to the UE 120, a semi-static indication that includes a configuration of a time pattern for switching a target PUCCH carrier between a first carrier and a second carrier, and the time pattern may apply to the first HARQ-ACK codebook and the second HARQ-ACK codebook. For example, the time pattern may be a periodic time pattern that indicates whether the target PUCCH carrier is the first carrier or the second carrier for each slot of a set of slots or for each sub-slot of a set of sub-slots. The first carrier may be the PCell of the PUCCH group, and the second carrier may be an SCell of the PUCCH group (e.g., a PUCCH SCell configured for both of the first and second HARQ-ACK codebooks). In this case, the same time pattern applies to both the first HARQ-ACK codebook and the second HARQ-ACK codebook. The base station 110 may configure the time pattern in accordance with a numerology of the first carrier (e.g., the PCell).

In some aspects, in a case in which PUCCH carrier switching is enabled for both the first HARQ-ACK codebook and the second HARQ-ACK codebook, the base station 110 may separately configure respective time patterns for the first and second HARQ-ACK codebooks. For example, the base station 110 may transmit, to the UE 120, a semi-static indication that includes a first configuration of a first time pattern for switching a first target PUCCH carrier associated with the first HARQ-ACK codebook, and the base station 110 may transmit, to the UE 120, a semi-static indication that includes a second configuration of second time pattern for switching a second target PUCCH carrier associated with the second HARQ-ACK codebook. The first time pattern may be a periodic time pattern (e.g., over a set of slots or sub-slots) for switching the first target PUCCH carrier between the PCell of the PUCCH group and a first SCell (e.g., a configured PUCCH SCell) of the PUCCH group. In some aspects, the second time pattern may be a periodic time pattern (e.g., over a set of slots or sub-slots) for switching the second target PUCCH carrier between the PCell of the PUCCH group and the first SCell of the PUCCH group. In this case, the first SCell may be a PUCCH SCell configured for both the first HARQ-ACK codebook and the second HARQ-ACK codebook. In some aspects, the second time pattern may be a periodic time pattern (e.g., over a set of slots or sub-slots) for switching the second target PUCCH carrier between the PCell of the PUCCH group and a second SCell of the PUCCH group. In this case, the first SCell may be a PUCCH SCell configured for the first HARQ-ACK codebook, and the second SCell may be a PUCCH SCell configured for the second HARQ-ACK codebook. The base station 110 may configure the first time pattern and the second time pattern in accordance with the numerology of the PCell.

In some aspects, the at least one indication of the PUCCH carrier switch may include at least one dynamic indication of the PUCCH carrier switch. For example, the base station 110 may transmit the at least one dynamic indication of the PUCCH carrier switch to the UE 120 in DCI. For example, the at least one dynamic indication of the PUCCH carrier switch may be included in DCI that schedules at least one downlink communication (e.g., PDSCH communication) to be received by the UE 120.

In some aspects, the base station 110 may transmit, to the UE 120, DCI that indicates a target PUCCH carrier, and the UE 120 may use the target PUCCH carrier indicated in the DCI only for the HARQ-ACK codebook associated with a priority indicated in the DCI. For example, the UE 120 may receive, from the base station 110, a first indication of a first target PUCCH carrier associated with the first HARQ-ACK codebook in first DCI that indicates a first priority associated with the first HARQ-ACK codebook. Additionally, or alternatively, the UE 120 may receive, from the base station 110, a second indication of a second target PUCCH carrier associated with the second HARQ-ACK codebook in second DCI that indicates a second priority associated with the second HARQ-ACK codebook. In some aspects, in a case in which PUCCH carrier switching is enabled for both the first HARQ-ACK codebook and the second HARQ-ACK codebook, the base station 110 may transmit, and the UE 120 may receive, separate dynamic indications of the first target PUCCH carrier associated with the first HARQ-ACK codebook (e.g., in DCI that indicates the first priority) and the second target PUCCH carrier associated with the second HARQ-ACK codebook (e.g., in DCI that indicates the second priority).

In some aspects, in a case in which PUCCH carrier switching is enabled for both the first HARQ-ACK codebook and the second HARQ-ACK codebook, the base station 110 may transmit, to the UE 120, DCI that indicates a target PUCCH carrier, and the UE 120 may use the target PUCCH carrier indicated in the DCI for both of the first and second HARQ-ACK codebooks. For example, the UE 120 may receive, from the base station 110, an indication of the target PUCCH carrier in DCI that indicates a first priority associated with the first HARQ-ACK codebook, and the indication of the target PUCCH carrier may apply to the first HARQ-ACK codebook and the second HARQ-ACK codebook.

In some aspects, in a case in which PUCCH carrier switching is enabled for both the first HARQ-ACK codebook and the second HARQ-ACK codebook, the UE 120 may determine whether the target PUCCH carrier indicated in the DCI applies only to the HARQ-ACK codebook associated with the priority indicated in the DCI or whether the target cell indicated in the DCI applies to both of the first and second HARQ-ACK codebooks based at least in part on whether the first and second HARQ-ACK codebooks are configured with the same slot configuration (e.g., in terms of slot or sub-slot based PUCCH transmission). In this case, the UE 120 may use the target PUCCH carrier indicated in the DCI for both HARQ-ACK codebooks if the first and second HARQ-ACK codebooks are configured with the same slot/sub-slot configuration (e.g., both slot based or both sub-slot based). The UE 120 may use the target PUCCH carrier indicated in the DCI only for the HARQ-ACK codebook associated with the priority indicated in the DCI if the first and second HARQ-ACK codebooks are configured with different slot/sub-slot configurations (e.g., one HARQ-ACK codebook is slot based, and the other HARQ-ACK codebook is sub-slot based). For example, the UE 120 may receive, from the base station 110 an indication of the target PUCCH carrier in DCI that indicates the first priority associated with the first HARQ-ACK codebook. The UE 120 may determine that the indication of the target PUCCH carrier applies to the first HARQ-ACK codebook and the second HARQ-ACK codebook in connection with the first HARQ-ACK codebook and the second HARQ-ACK codebook having the same slot/sub-slot configuration. The UE 120 may determine that the indication of the target PUCCH carrier applies to the first HARQ-ACK codebook and not to the second HARQ-ACK codebook in connection with the first HARQ-ACK codebook and the second HARQ-ACK codebook having different slot/sub-slot configurations.

In some aspects, in a case in which separate indications (e.g., dynamic and/or semi-static indications) are used to indicate different target PUCCH carriers for the first and second HARQ-ACK codebooks for a slot or sub-slot, the UE 120 may not expect to be scheduled to transmit HARQ feedback associated with both the first and second HARQ-ACK codebooks in that slot or sub-slot. For example, in a case in which separate dynamic indications in separate DCI are used to indicate the first target PUCCH carrier and the second target PUCCH carrier, the UE 120 may not expect to receive first and second DCI that schedule respective transmissions of the first and second HARQ codebook in the same slot or sub-slot and on different target PUCCH carriers. In a case in which the PUCCH carrier switching is indicated using semi-static indications for the first and second HARQ-ACK codebooks and the semi-static indications indicate different target PUCCH cells for the first and second HARQ-ACK codebooks in a slot, the UE 120 may not expect to be scheduled to transmit HARQ feedback associated with both the first HARQ-ACK codebook and the second HARQ-ACK codebook on the different target PUCCH cells in the same slot. For example, the UE 120 may detect an error condition in a case in which the UE 120 receives first DCI that schedules a transmission of first HARQ feedback in the first HARQ-ACK codebook on a first target PUCCH carrier, and the UE 120 receives second DCI that schedules a transmission of second HARQ feedback in the second HARQ-ACK codebook in a same slot or sub-slot as the transmission of the first HARQ feedback but on a second target PUCCH carrier that is different from the first target PUCCH carrier. In some aspects, the base station 110 may refrain from scheduling transmissions of the first and second HARQ-ACK codebooks in the same slot or sub-slot and on different target PUCCH carriers. For example, in a case in which the base station 110 schedules, for the UE 120, a first transmission of HARQ feedback in the first HARQ-ACK codebook on the first target PUCCH carrier, the base station 110 may, and/or be required to, schedule a second transmission of HARQ feedback in the second HARQ-ACK codebook in a different slot or sub-slot from the first transmission of HARQ feedback or on a second target PUCCH carrier that is the same as the first target PUCCH carrier.

In some aspects, in a case in which PUCCH carrier switching is enabled for both of the first HARQ-ACK codebook and the second HARQ-ACK codebook, the base station 110 may use a same type of PUCCH switching indication to indicate the respective target PUCCH carriers for the first and second HARQ-ACK codebooks. For example, the base station 110 may transmit, to the UE 120, a first indication of the PUCCH carrier switch for the first HARQ-ACK codebook and a second indication of the PUCCH carrier switch for the second HARQ-ACK codebook, and the first indication and the second indication may both be dynamic indications or both semi-static indications.

In some aspects, in a case in which PUCCH carrier switching is enabled for both of the first HARQ-ACK codebook and the second HARQ-ACK codebook, the base station 110 may use a different types of PUCCH switching indications to indicate the respective target PUCCH carriers for the first and second HARQ-ACK codebooks. For example, the base station 110 may transmit, to the UE 120, a semi-static indication of the PUCCH carrier switch for the first HARQ-ACK codebook and a dynamic indication of the PUCCH carrier switch for the second HARQ-ACK codebook. In some aspects, the base station 110 may use a dynamic indication for the HARQ-ACK codebook associated with the higher priority, and the base station 110 may use a semi-static indication for the HARQ-ACK codebook associated with the lower priority. In some aspects, the base station 110 may use the semi-static indication for the HARQ-ACK codebook associated with the higher priority, and the base station 110 may use the dynamic indication for the HARQ-ACK codebook associated with the lower priority.

In some aspects, in a case in which PUCCH carrier switching is enabled for one of the first HARQ-ACK codebook or the second HARQ-ACK codebook, and PUCCH carrier switching is disabled for the other one of the first HARQ-ACK codebook or the second HARQ-ACK codebook, the base station 110 may transmit, to the UE 120, a semi-static indication of the PUCCH carrier switch or a dynamic indication of the PUCCH carrier switch that applies only to the one of the first HARQ-ACK codebook or the second HARQ-ACK codebook for which PUCCH carrier switching is enabled. In this case, the UE 120 may transmit HARQ feedback associated with the other one of the first HARQ-ACK codebook or the second HARQ-ACK codebook (e.g., for which PUCCH carrier switching is not enabled) on the PCell of the PUCCH group.

As further shown in FIG. 8, and by reference number 815, the base station 110 may transmit, to the UE 120, at least one downlink communication. In some aspects, the base station 110 may transmit, to the UE 120, at least one downlink communication associated with at least one of the first HARQ-ACK codebook or the second HARQ-ACK codebook for which PUCCH carrier switching is enabled. The UE 120 may receive the at least one downlink communication transmitted by the base station 110. For example, the at least one downlink communication may include at least one PDSCH communication. In some aspects, a PDSCH communication may be scheduled by DCI transmitted to the UE 120 by the base station 110. The DCI may indicate a priority associated with the PDSCH communication, a K1 value that indicates the offset to the slot or sub-slot in which the UE 120 is to transmit the HARQ feedback (e.g., HARQ-ACK) for the PDSCH communication, and a priority associated with the PDSCH communication. In some aspects, the DCI may also include an indication of the target PUCCH carrier. In some aspects, the at least one downlink communication may include an SPS PDSCH communication. In some aspects, the at least one downlink communication may include a PDCCH communication indicating an SPS PDSCH release and/or a PDCCH communication indicating SCell dormancy. In such cases, the PDCCH may not schedule a PDSCH communication, but UE 120 may still be scheduled to transmit HARQ feedback (e.g., a HARQ-ACK) to the BS to acknowledge the reception of the PDCCH communication.

In some aspects, the base station 110 may transmit, and the UE 120 may receive, a first downlink communication associated with the first HARQ-ACK codebook and a second downlink communication associated with the second HARQ-ACK codebook. For example, the first downlink communication may be associated with the first priority associated with the first HARQ-ACK codebook, and the second downlink communication may be associated with the second priority associated with the second HARQ-ACK codebook.

As further shown in FIG. 8, and by reference number 820, the UE 120 may transmit, to the base station 110, HARQ feedback for the at least one downlink communication in the first HARQ-ACK codebook and/or the second HARQ-ACK codebook on a target PUCCH carrier based at least in part on the indication of the PUCCH carrier switch.

For each downlink communication received by the UE 120, the UE 120 may determine whether the downlink communication is associated with the first HARQ-ACK codebook or the second HARQ-ACK codebook. For example, the UE 120 may determine whether a priority associated with the downlink communication (e.g., a priority index indicated in a priority indicator field in the DCI) is a first priority associated with the first HARQ-ACK codebook or a second priority associated with the second HARQ-ACK codebook. In some aspects, in a case in which PUCCH carrier switch is enabled for the HARQ-ACK codebook associated with the downlink communication, the UE 120 may determine the target PUCCH carrier for transmitting the HARQ-ACK codebook in accordance with the indication of the PUCCH switch for the HARQ-ACK codebook. For example, the UE 120 may determine the target PUCCH carrier in accordance with the semi-static indication of a time pattern for PUCCH switching for the HARQ-ACK codebook or the dynamic indication of the target PUCCH carrier received in DCI. The UE 120 may determine the slot or sub-slot for transmitting the PDCCH feedback for the downlink communication using the K1 value associated with the downlink communication. The UE 120 may select a PUCCH resource from a set of PUCCH resources configured for the corresponding HARQ-ACK codebook in the slot or sub-slot. For example, the DCI that schedules the downlink communication may include a PRI that indicates which PUCCH resource to select on the target PUCCH carrier in the slot or sub-slot. The UE 120 may transmit the HARQ-ACK codebook (e.g., the first or second HARQ-ACK codebook) including the HARQ feedback (e.g., HARQ-ACK) for the downlink communication on the target PUCCH carrier in the select PUCCH resources.

In some aspects, in a case in which PUCCH carrier switching is enabled for both the first HARQ-ACK codebook and the second HARQ-ACK codebook, the UE 120 may receive a first downlink communication associated with the first HARQ-ACK codebook and a second downlink communication associated with the second HARQ-ACK codebook. The UE 120 may determine a first target PUCCH carrier associated with the first HARQ-ACK codebook, and the UE 120 may determine a second target PUCCH carrier associated with the second HARQ-ACK codebook. For example, the UE 120 may determine the first target PUCCH carrier and the second target PUCCH carrier from respective indications (e.g., semi-static and/or dynamic indications) associated with the first and second HARQ-ACK codebooks or from an indication (e.g., a semi-static or dynamic indication) that applies to both of the first and second HARQ-ACK codebooks. The UE 120 may determine slots or sub-slots for transmitting first HARQ feedback for the first downlink communication and second HARQ feedback for the second downlink communication.

In some aspects, the transmission of the first HARQ feedback and the transmission of the second HARQ feedback may be scheduled in overlapping slots or sub-slots. In some aspects, the UE 120 may not expect transmission of the first HARQ feedback and the transmission of the second HARQ feedback to be scheduled in overlapping slots or sub-slots with the second target PUCCH carrier associated with the second HARQ-ACK codebook being different from the first target PUCCH carrier associated with the first HARQ-ACK codebook in the overlapping slots or sub-slots in which the transmission of the first HARQ feedback and the transmission of the second HARQ feedback are scheduled. In this case, the UE 120 may detect an error condition in connection with the transmission of the first HARQ feedback and the transmission of the second HARQ feedback being scheduled in overlapping slots or sub-slots and the second target PUCCH carrier being different from the first target PUCCH carrier in the overlapping slots or sub-slots. In some aspects, the base station 110 may refrain from scheduling the transmissions of HARQ feedback associated with different HARQ-ACK codebooks in overlapping slots or sub-slots in which different target PUCCH carriers are indicated for the HARQ-ACK codebooks. For example, the base station 110 may, and/or be required to, schedule the transmissions of the first HARQ feedback and the second HARQ feedback in non-overlapping slots or sub-slots or in overlapping slots or sub-slots in which the first target PUCCH associated with the first HARQ-ACK codebook is the same as the second target PUCCH associated with the second HARQ-ACK codebook.

In some aspects, in a case in which the transmission of the first HARQ feedback and the transmission of the second HARQ feedback are scheduled in overlapping slots or sub-slots and the first target PUCCH carrier is different from the second target PUCCH carrier in the overlapping slots or sub-slots, the UE 120 may set the target PUCCH carrier to be the target PUCCH carrier associated with the higher priority (e.g., the first target PUCCH carrier or the second target PUCCH carrier), transmit the HARQ feedback associated with the higher priority on the target PUCCH carrier, and drop (e.g., refrain from transmitting) the HARQ feedback associated with the lower priority. For example, the first priority associated with the first HARQ-ACK codebook may be higher than the second priority associated with the second HARQ-ACK codebook. In this case, in connection with a determination that the transmission of the first HARQ feedback and the transmission of the second HARQ feedback are scheduled in overlapping slots or sub-slots in which the first target PUCCH carrier is different from the second target PUCCH carrier, the UE 120 may transmit the first HARQ feedback on the first target PUCCH carrier in the scheduled slot or sub-slot, and the UE 120 may refrain from transmitting (e.g., drop) the second HARQ feedback.

In some aspects, in a case in which the transmission of the first HARQ feedback and the transmission of the second HARQ feedback are scheduled in overlapping slots or sub-slots and the first target PUCCH carrier is different from the second target PUCCH carrier in the overlapping slots or sub-slots, the UE 120 may set the target PUCCH carrier to be the target PUCCH carrier associated with the higher priority (e.g., the first target PUCCH carrier or the second target PUCCH carrier), and transmit the HARQ feedback associated with the lower priority together with the HARQ feedback associated with the higher priority on the target PUCCH carrier associated with the higher priority. For example, the first priority associated with the first HARQ-ACK codebook may be higher than the second priority associated with the second HARQ-ACK codebook. In this case, in connection with a determination that the transmission of the first HARQ feedback and the transmission of the second HARQ feedback are scheduled in overlapping slots or sub-slots in which the first target PUCCH carrier is different from the second target PUCCH carrier, the UE 120 may transmit the first HARQ feedback together with the second HARQ feedback on the first target PUCCH carrier. For example, the UE 120 may multiplex the second HARQ feedback together with the first HARQ feedback in the PUCCH resources configured for the first HARQ-ACK codebook on the first target PUCCH carrier.

As indicated above, FIG. 8 is provided as an example. Other examples may differ from what is described with respect to FIG. 8.

Figure 9:
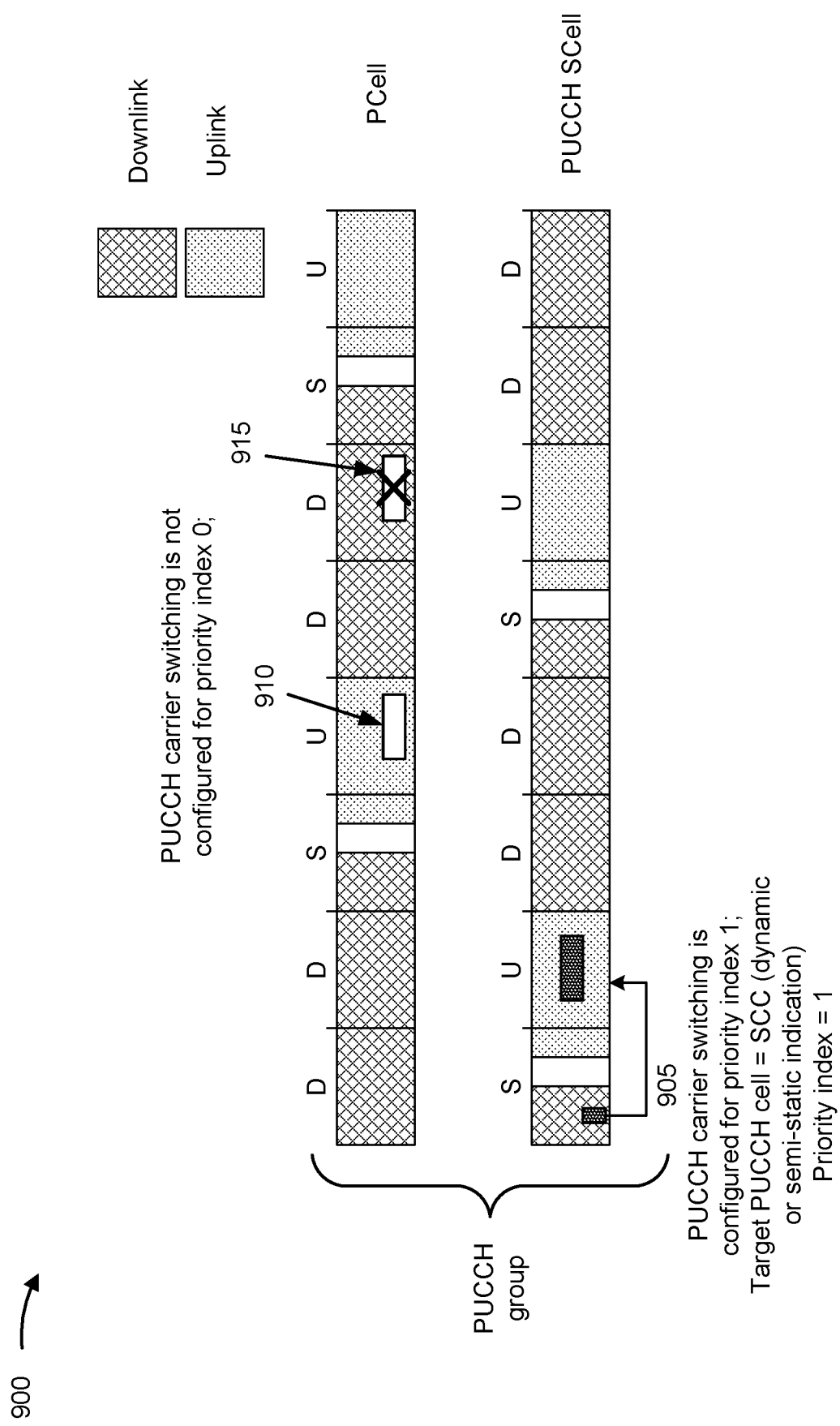

FIG. 9 is a diagram illustrating an example 900 associated with PUCCH carrier switch with multiple HARQ-ACK codebooks, in accordance with the present disclosure. As shown in FIG. 9, a PUCCH group includes a PCell and a PUCCH SCell. In some aspects, the PUCCH group may also include one or more other SCells.

As described above, a UE 120 may receive a configuration of a first HARQ-ACK codebook associated with a first priority and a second HARQ-ACK codebook associated with a second priority, and the configuration may indicate whether PUCCH carrier switching is enabled for each of the first and second HARQ-ACK codebooks. As shown in example 900, PUCCH carrier switching maybe configured/enabled for the first HARQ-ACK codebook and PUCCH carrier switching may not be configured/enabled for the second HARQ-ACK codebook. In example 900, the first HARQ-ACK codebook may be associated a high priority (e.g., priority index=1) and the second HARQ-ACK codebook may be associated with a low priority (e.g., priority index=0).

As shown by reference number 905, the UE 120 may receive, in a first slot, DCI the schedules a downlink communication associated with the first priority (e.g., priority index=1). The DCI may schedule the HARQ feedback for the downlink communication in the next slot. PUCCH carrier switching may be configured/enabled for the first HARQ-ACK codebook associated with the first priority (e.g., priority index=1), and the target PUCCH carrier associated the transmission of the HARQ feedback in the first HARQ-ACK codebook (e.g., indicted via a dynamic or semi-static indication) is the PUCCH SCell. The UE 120, in accordance with the indication that the target PUCCH is the PUCCH SCell, may transmit the first HARQ-ACK codebook including the HARQ feedback in the second slot on the PUCCH SCell.

As shown by reference number 910, the UE 120 may transmit HARQ feedback for a downlink communication associated with the second priority (e.g., priority index=0) in the second HARQ-ACK codebook on the PCell. In some aspects, because PUCCH carrier switching is not enabled/configured for the second HARQ-ACK codebook, the UE 120 may only transmit HARQ feedback associated with the second priority (e.g., priority index=0) on the PCell. As shown by reference number 915, in a case in which a PUCCH transmission (e.g., a transmission of HARQ feedback) associated with the second priority (e.g., priority index=0) is scheduled on a downlink slot, the UE 120 may drop the PUCCH transmission (e.g., refrain from transmitting the PUCCH transmission).

As indicated above, FIG. 9 is provided as an example. Other examples may differ from what is described with respect to FIG. 9.

Figure 10:
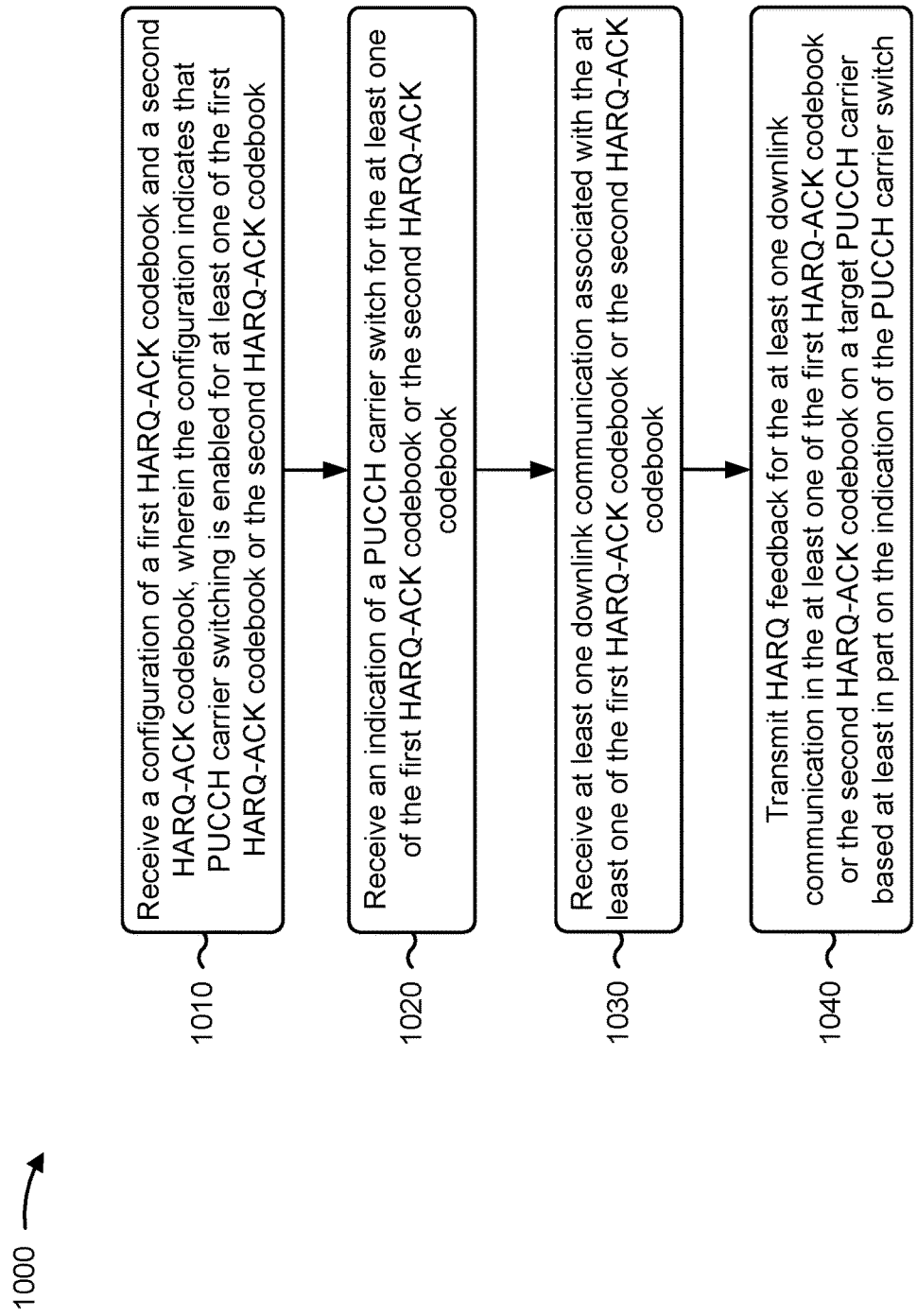
FIGS. 10-11 are diagrams illustrating example processes associated with PUCCH carrier switch with multiple HARQ-ACK codebooks, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with PUCCH carrier switch with multiple HARQ-ACK codebooks.

As shown in FIG. 10, in some aspects, process 1000 may include receiving a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook (block 1010). For example, the UE (e.g., using communication manager 140 and/or reception component 1202, depicted in FIG. 12) may receive a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook, as described above.

As further shown in FIG. 10, in some aspects, process 1000 may include receiving an indication of a PUCCH carrier switch for the at least one of the first HARQ-ACK codebook or the second HARQ-ACK codebook (block 1020). For example, the UE (e.g., using communication manager 140 and/or reception component 1202, depicted in FIG. 12) may receive an indication of a PUCCH carrier switch for the at least one of the first HARQ-ACK codebook or the second HARQ-ACK codebook, as described above.

As further shown in FIG. 10, in some aspects, process 1000 may include receiving at least one downlink communication associated with the at least one of the first HARQ-ACK codebook or the second HARQ-ACK codebook (block 1030). For example, the UE (e.g., using communication manager 140 and/or reception component 1202, depicted in FIG. 12) may receive at least one downlink communication associated with the at least one of the first HARQ-ACK codebook or the second HARQ-ACK codebook, as described above.

As further shown in FIG. 10, in some aspects, process 1000 may include transmitting HARQ feedback for the at least one downlink communication in the at least one of the first HARQ-ACK codebook or the second HARQ-ACK codebook on a target PUCCH carrier based at least in part on the indication of the PUCCH carrier switch (block 1040). For example, the UE (e.g., using communication manager 140 and/or transmission component 1204, depicted in FIG. 12) may transmit HARQ feedback for the at least one downlink communication in the at least one of the first HARQ-ACK codebook or the second HARQ-ACK codebook on a target PUCCH carrier based at least in part on the indication of the PUCCH carrier switch, as described above.

Process 1000 may include additional aspects, such as any single aspect or any combination of aspects described below and/or in connection with one or more other processes described elsewhere herein.

In a first aspect, the configuration indicates that PUCCH carrier switching is enabled for the first HARQ-ACK codebook and the second HARQ-ACK codebook.

In a second aspect, the configuration includes a joint indication that PUCCH carrier switching is enabled for both the first HARQ-ACK codebook and the second HARQ-ACK codebook.

In a third aspect, receiving the indication of the PUCCH carrier switch for the at least one of the first HARQ-ACK codebook or the second HARQ-ACK codebook includes receiving a configuration of a time pattern for switching the target PUCCH carrier between a first carrier and a second carrier, and the time pattern applies to the first HARQ-ACK codebook and the second HARQ-ACK codebook.

In a fourth aspect, receiving the indication of the PUCCH carrier switch for the at least one of the first HARQ-ACK codebook or the second HARQ-ACK codebook includes receiving a first configuration of a first time pattern for switching a first target PUCCH carrier associated with the first HARQ-ACK codebook and a second configuration of a second time pattern for switching a second target PUCCH carrier associated with the second HARQ-ACK codebook.

In a fifth aspect, receiving the indication of the PUCCH carrier switch for the at least one of the first HARQ-ACK codebook or the second HARQ-ACK codebook includes receiving, in first DCI that indicates a first priority associated with the first HARQ-ACK codebook, a first indication of a first target PUCCH carrier to be used to transmit the first HARQ-ACK codebook.

In a sixth aspect, receiving the indication of the PUCCH carrier switch for the at least one of the first HARQ-ACK codebook or the second HARQ-ACK codebook further includes receiving, in second DCI that indicates a second priority associated with the second HARQ-ACK codebook, a second indication of a second target PUCCH carrier to be used to transmit the second HARQ-ACK codebook.

In a seventh aspect, receiving the indication of the PUCCH carrier switch for the at least one of the first HARQ-ACK codebook or the second HARQ-ACK codebook includes receiving an indication of the target PUCCH carrier in DCI that indicates a first priority associated with the first HARQ-ACK codebook, and the indication of the target PUCCH carrier applies to the first HARQ-ACK codebook and the second HARQ-ACK codebook.

In an eighth aspect, receiving the indication of the PUCCH carrier switch for the at least one of the first HARQ-ACK codebook or the second HARQ-ACK codebook includes receiving an indication of the target PUCCH carrier in DCI that indicates a first priority associated with the first HARQ-ACK codebook, and the indication of the target PUCCH carrier applies to the first HARQ-ACK codebook and the second HARQ-ACK codebook in connection with the first HARQ-ACK codebook and the second HARQ-ACK codebook having a same slot configuration, or the indication of the target PUCCH carrier applies to the first HARQ-ACK codebook and not to the second HARQ-ACK codebook in connection with the first HARQ-ACK codebook and the second HARQ-ACK codebook having different slot configurations.

In a ninth aspect, the configuration indicates whether the PUCCH carrier switching is enabled for a single one of the first HARQ-ACK codebook or the second HARQ-ACK codebook, or the PUCCH carrier switching is enabled for both the first HARQ-ACK codebook and the second HARQ-ACK codebook.

In a tenth aspect, the configuration indicates that the PUCCH carrier switching is enabled for the first HARQ-ACK codebook and not enabled for the second HARQ-ACK codebook.

In an eleventh aspect, the target PUCCH carrier includes at least one of a first target PUCCH carrier associated with the first HARQ-ACK codebook or a second target PUCCH carrier associated with the second HARQ-ACK codebook, the first target PUCCH carrier is a primary cell of a PUCCH group or a PUCCH secondary cell of the PUCCH group, and the second target PUCCH carrier is the primary cell of the PUCCH group or the PUCCH secondary cell of the PUCCH group.

In a twelfth aspect, the target PUCCH carrier includes at least one of a first target PUCCH carrier associated with the first HARQ-ACK codebook or a second target PUCCH carrier associated with the second HARQ-ACK codebook, the first target PUCCH carrier is a primary cell of a PUCCH group or a first PUCCH secondary cell of the PUCCH group, and the second target PUCCH carrier is the primary cell of the PUCCH group or a second PUCCH secondary cell of the PUCCH group.

In a thirteenth aspect, receiving the at least one downlink communication includes receiving a first downlink communication associated with the first HARQ-ACK codebook, and receiving a second downlink communication associated with the second HARQ-ACK codebook.

In a fourteenth aspect, the indication includes a first indication of a first target PUCCH carrier associated with the first HARQ-ACK codebook and a second indication of a second target PUCCH carrier associated with the second HARQ-ACK codebook, and a transmission of first HARQ feedback for the first downlink communication and a transmission of second HARQ feedback for the second downlink communication are scheduled in overlapping slots or sub-slots.

In a fifteenth aspect, process 1000 includes detecting an error condition in connection with the transmission of the first HARQ feedback and the transmission of the second HARQ feedback being scheduled in the overlapping slots or sub-slots and the second target PUCCH carrier being different from the first target PUCCH carrier in the overlapping slots or sub-slots.

In a sixteenth aspect, the first HARQ-ACK codebook is associated with a first priority and the second HARQ-ACK codebook is associated with a second priority that is lower than the first priority, and transmitting the HARQ feedback includes transmitting the first HARQ feedback on the first target PUCCH carrier, and refraining from transmitting the second HARQ feedback, in connection with the second target PUCCH carrier being different from the first target PUCCH carrier in the overlapping slots or sub-slots.

In a seventeenth aspect, the first HARQ-ACK codebook is associated with a first priority and the second HARQ-ACK codebook is associated with a second priority that is lower than the first priority, and transmitting the HARQ feedback includes transmitting the first HARQ feedback and the second HARQ feedback on the first target PUCCH carrier, in connection with the second target PUCCH being different from the first target PUCCH carrier in the overlapping slots or sub-slots.

In an eighteenth aspect, receiving the indication of the PUCCH carrier switch for the at least one of the first HARQ-ACK codebook or the second HARQ-ACK codebook includes receiving first DCI that indicates a first target PUCCH carrier for a transmission of first HARQ feedback in the first HARQ-ACK codebook, and receiving second DCI that indicates a second target PUCCH carrier for a transmission of second HARQ feedback in the second HARQ-ACK codebook, and the second DCI schedules the transmission of the second HARQ feedback in a different slot or sub-slot from the transmission of the first HARQ feedback or the second target PUCCH carrier indicated by the second DCI is a same PUCCH carrier as the first target PUCCH carrier indicated by the first DCI.

In a nineteenth aspect, the configuration indicates that PUCCH carrier switching is enabled for the first HARQ-ACK codebook and the second HARQ-ACK codebook, and the first HARQ-ACK codebook and the second HARQ-ACK codebook are both slot based HARQ-ACK codebooks or sub-slot based HARQ-ACK codebooks.

In a twentieth aspect, the first HARQ-ACK codebook and the second HARQ-ACK codebooks are both sub-slot based HARQ-ACK codebooks with a same sub-slot length configuration.

In a twenty-first aspect, receiving the indication of the PUCCH carrier switch for the at least one of the first HARQ-ACK codebook or the second HARQ-ACK codebook includes receiving a first indication of the PUCCH carrier switch for the first HARQ-ACK codebook and a second indication of the PUCCH carrier switch for the second HARQ-ACK codebook, and the first indication and the second indication are both dynamic indications or both semi-static indications.

In a twenty-second aspect, receiving the indication of the PUCCH carrier switch for the at least one of the first HARQ-ACK codebook or the second HARQ-ACK codebook includes receiving a first indication of the PUCCH carrier switch for the first HARQ-ACK codebook and a second indication of the PUCCH carrier switch for the second HARQ-ACK codebook, and the first indication is a semi-static indication and the second indication is a dynamic indication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
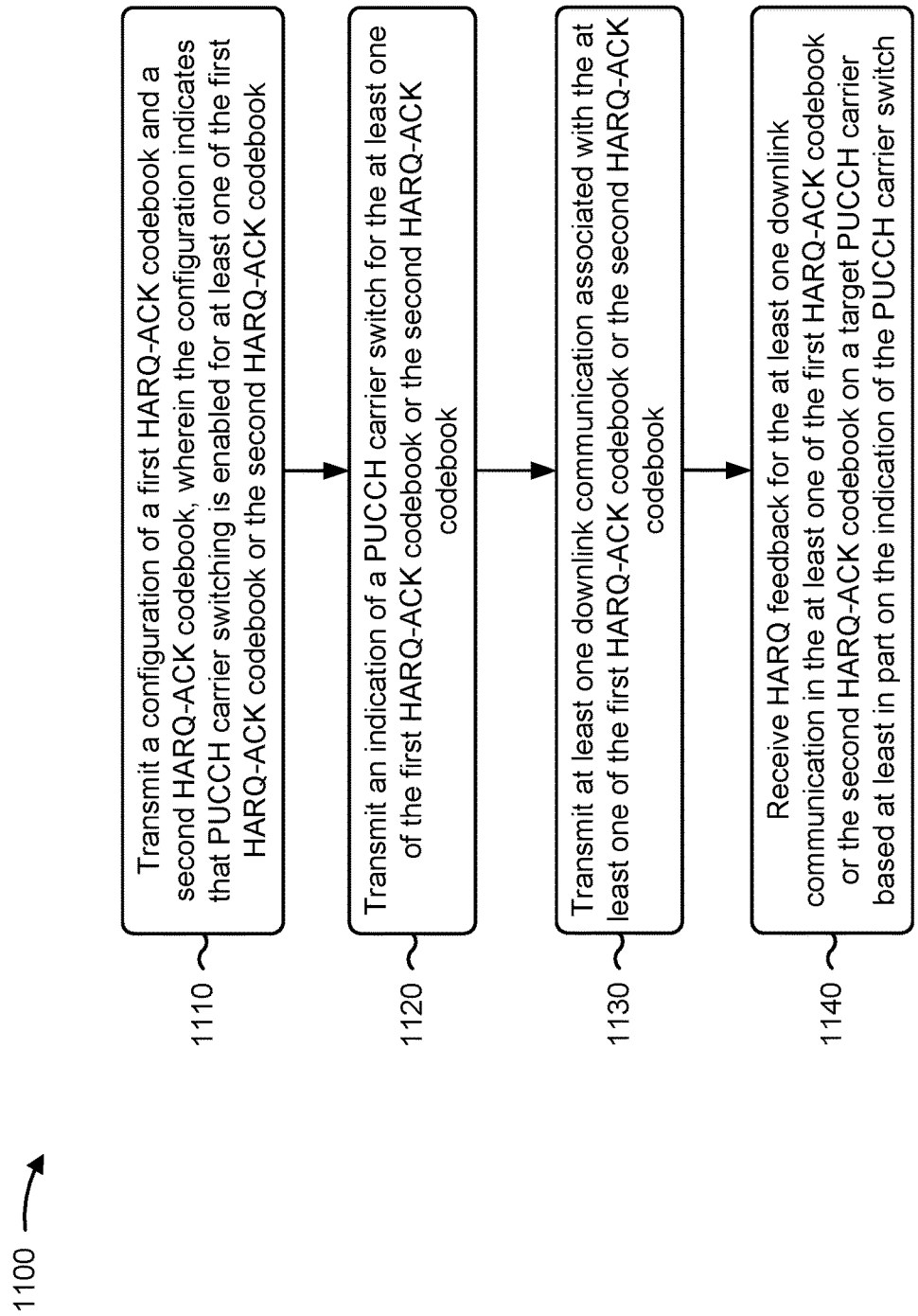

FIG. 11 is a diagram illustrating an example process 1100 performed, for example, by a base station, in accordance with the present disclosure. Example process 1100 is an example where the base station (e.g., base station 110) performs operations associated with PUCCH carrier switch with multiple HARQ-ACK codebooks.

As shown in FIG. 11, in some aspects, process 1100 may include transmitting, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook (block 1110). For example, the base station (e.g., using communication manager 150 and/or transmission component 1304, depicted in FIG. 13) may transmit, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook, as described above.

As further shown in FIG. 11, in some aspects, process 1100 may include transmitting, to the UE, an indication of a PUCCH carrier switch for the at least one of the first HARQ-ACK codebook or the second HARQ-ACK codebook (block 1120). For example, the base station (e.g., using communication manager 150 and/or transmission component 1304, depicted in FIG. 13) may transmit, to the UE, an indication of a PUCCH carrier switch for the at least one of the first HARQ-ACK codebook or the second HARQ-ACK codebook, as described above.

As further shown in FIG. 11, in some aspects, process 1100 may include transmitting, to the UE, at least one downlink communication associated with the at least one of the first HARQ-ACK codebook or the second HARQ-ACK codebook (block 1130). For example, the base station (e.g., using communication manager 150 and/or transmission component 1304, depicted in FIG. 13) may transmit, to the UE, at least one downlink communication associated with the at least one of the first HARQ-ACK codebook or the second HARQ-ACK codebook, as described above.

As further shown in FIG. 11, in some aspects, process 1100 may include receiving, from the UE, HARQ feedback for the at least one downlink communication in the at least one of the first HARQ-ACK codebook or the second HARQ-ACK codebook on a target PUCCH carrier based at least in part on the indication of the PUCCH carrier switch (block 1140). For example, the base station (e.g., using communication manager 150 and/or reception component 1302, depicted in FIG. 13) may receive, from the UE, HARQ feedback for the at least one downlink communication in the at least one of the first HARQ-ACK codebook or the second HARQ-ACK codebook on a target PUCCH carrier based at least in part on the indication of the PUCCH carrier switch, as described above.

Process 1100 may include additional aspects, such as any single aspect or any combination of aspects described below and/or in connection with one or more other processes described elsewhere herein.

In a first aspect, the configuration indicates that PUCCH carrier switching is enabled for the first HARQ-ACK codebook and the second HARQ-ACK codebook.

In a second aspect, the configuration includes a joint indication that PUCCH carrier switching is enabled for both the first HARQ-ACK codebook and the second HARQ-ACK codebook.

In a third aspect, transmitting the indication of the PUCCH carrier switch for the at least one of the first HARQ-ACK codebook or the second HARQ-ACK codebook includes transmitting, to the UE, a configuration of a time pattern for switching the target PUCCH carrier between a first carrier and a second carrier, and the time pattern applies to the first HARQ-ACK codebook and the second HARQ-ACK codebook.

In a fourth aspect, transmitting the indication of the PUCCH carrier switch for the at least one of the first HARQ-ACK codebook or the second HARQ-ACK codebook includes transmitting, to the UE, a first configuration of a first time pattern for switching a first target PUCCH carrier associated with the first HARQ-ACK codebook and a second configuration of a second time pattern for switching a second target PUCCH carrier associated with the second HARQ-ACK codebook.

In a fifth aspect, transmitting the indication of the PUCCH carrier switch for the at least one of the first HARQ-ACK codebook or the second HARQ-ACK codebook includes transmitting, to the UE in first DCI that indicates a first priority associated with the first HARQ-ACK codebook, a first indication of a first target PUCCH carrier to be used to transmit the first HARQ-ACK codebook.

In a sixth aspect, transmitting the indication of the PUCCH carrier switch for the at least one of the first HARQ-ACK codebook or the second HARQ-ACK codebook further includes transmitting, to the UE in second DCI that indicates a second priority associated with the second HARQ-ACK codebook, a second indication of a second target PUCCH carrier to be used to transmit the second HARQ-ACK codebook.

In a seventh aspect, transmitting the indication of the PUCCH carrier switch for the at least one of the first HARQ-ACK codebook or the second HARQ-ACK codebook includes transmitting, to the UE, an indication of the target PUCCH carrier in DCI that indicates a first priority associated with the first HARQ-ACK codebook, and the indication of the target PUCCH carrier applies to the first HARQ-ACK codebook and the second HARQ-ACK codebook.

In an eighth aspect, transmitting the indication of the PUCCH carrier switch for the at least one of the first HARQ-ACK codebook or the second HARQ-ACK codebook includes transmitting, to the UE, an indication of the target PUCCH carrier in DCI that indicates a first priority associated with the first HARQ-ACK codebook, and the indication of the target PUCCH carrier applies to the first HARQ-ACK codebook and the second HARQ-ACK codebook in connection with the first HARQ-ACK codebook and the second HARQ-ACK codebook having a same slot configuration, or the indication of the target PUCCH carrier applies to the first HARQ-ACK codebook and not to the second HARQ-ACK codebook in connection with the first HARQ-ACK codebook and the second HARQ-ACK codebook having different slot configurations.

In a ninth aspect, the configuration indicates whether the PUCCH carrier switching is enabled for a single one of the first HARQ-ACK codebook or the second HARQ-ACK codebook, or the PUCCH carrier switching is enabled for both of the first HARQ-ACK codebook and the second HARQ-ACK codebook.

In a tenth aspect, the configuration indicates that the PUCCH carrier switching is enabled for the first HARQ-ACK codebook and not enabled for the second HARQ-ACK codebook.

In an eleventh aspect, the target PUCCH carrier includes at least one of a first target PUCCH carrier associated with the first HARQ-ACK codebook or a second target PUCCH carrier associated with the second HARQ-ACK codebook, the first target PUCCH carrier is a primary cell of a PUCCH group or a PUCCH secondary cell of the PUCCH group, and the second target PUCCH carrier is the primary cell of the PUCCH group or the PUCCH secondary cell of the PUCCH group.

In a twelfth aspect, the target PUCCH carrier includes at least one of a first target PUCCH carrier associated with the first HARQ-ACK codebook or a second target PUCCH carrier associated with the second HARQ-ACK codebook, the first target PUCCH carrier is a primary cell of a PUCCH group or a first PUCCH secondary cell of the PUCCH group, and the second target PUCCH carrier is the primary cell of the PUCCH group or a second PUCCH secondary cell of the PUCCH group.

In a thirteenth aspect, transmitting the at least one downlink communication includes transmitting, to the UE, a first downlink communication associated with the first HARQ-ACK codebook, and transmitting, to the UE, a second downlink communication associated with the second HARQ-ACK codebook.

In a fourteenth aspect, the indication includes a first indication of a first target PUCCH carrier associated with the first HARQ-ACK codebook and a second indication of a second target PUCCH carrier associated with the second HARQ-ACK codebook, and process 1100 includes refraining from scheduling a transmission, by the UE, of first HARQ feedback for the first downlink communication and a transmission, by the UE, of second HARQ feedback for the second downlink communication in overlapping slots or sub-slots in which the second target PUCCH carrier is different from the first target PUCCH carrier.

In a fifteenth aspect, transmitting the indication of the PUCCH carrier switch for the at least one of the first HARQ-ACK codebook or the second HARQ-ACK codebook includes transmitting, to the UE, first DCI that indicates a first target PUCCH carrier for a transmission of first HARQ feedback in the first HARQ-ACK codebook, and transmitting, to the UE, second DCI that indicates a second target PUCCH carrier for a transmission of second HARQ feedback in the second HARQ-ACK codebook, and the second DCI schedules the transmission of the second HARQ feedback in a different slot or sub-slot from the transmission of the first HARQ feedback or the second target PUCCH carrier indicated by the second DCI is a same PUCCH carrier as the first target PUCCH carrier indicated by the first DCI.

In a sixteenth aspect, the configuration indicates that PUCCH carrier switching is enabled for the first HARQ-ACK codebook and the second HARQ-ACK codebook, and the first HARQ-ACK codebook and the second HARQ-ACK codebook are both slot based HARQ-ACK codebooks or sub-slot based HARQ-ACK codebooks.

In a seventeenth aspect, the first HARQ-ACK codebook and the second HARQ-ACK codebooks are both sub-slot based HARQ-ACK codebooks with a same sub-slot length configuration.

In an eighteenth aspect, transmitting the indication of the PUCCH carrier switch for the at least one of the first HARQ-ACK codebook or the second HARQ-ACK codebook includes transmitting, to the UE, a first indication of the PUCCH carrier switch for the first HARQ-ACK codebook and a second indication of the PUCCH carrier switch for the second HARQ-ACK codebook, and the first indication and the second indication are both dynamic indications or both semi-static indications.

In a nineteenth aspect, transmitting the indication of the PUCCH carrier switch for the at least one of the first HARQ-ACK codebook or the second HARQ-ACK codebook includes transmitting, to the UE, a first indication of the PUCCH carrier switch for the first HARQ-ACK codebook and a second indication of the PUCCH carrier switch for the second HARQ-ACK codebook, and the first indication is a semi-static indication and the second indication is a dynamic indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
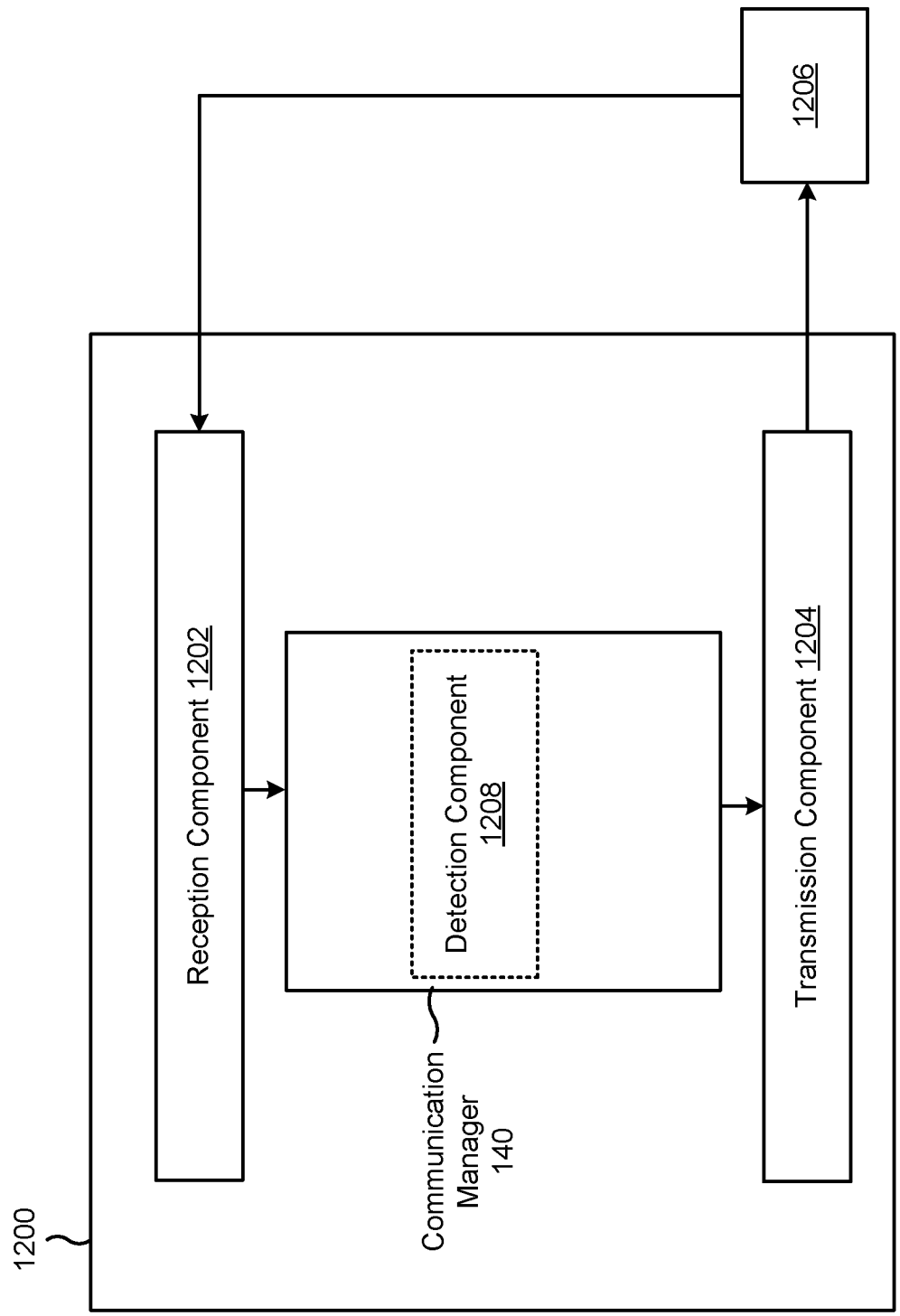
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a detection component 1208.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The reception component 1202 may receive an indication of a PUCCH carrier switch for the at least one of the first HARQ-ACK codebook or the second HARQ-ACK codebook. The reception component 1202 may receive at least one downlink communication associated with the at least one of the first HARQ-ACK codebook or the second HARQ-ACK codebook. The transmission component 1204 may transmit HARQ feedback for the at least one downlink communication in the at least one of the first HARQ-ACK codebook or the second HARQ-ACK codebook on a target PUCCH carrier based at least in part on the indication of the PUCCH carrier switch.

The detection component 1208 may detect an error condition in connection with the transmission of the first HARQ feedback and the transmission of the second HARQ feedback being scheduled in the overlapping slots or sub-slots and the second target PUCCH carrier being different from the first target PUCCH carrier in the overlapping slots or sub-slots.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
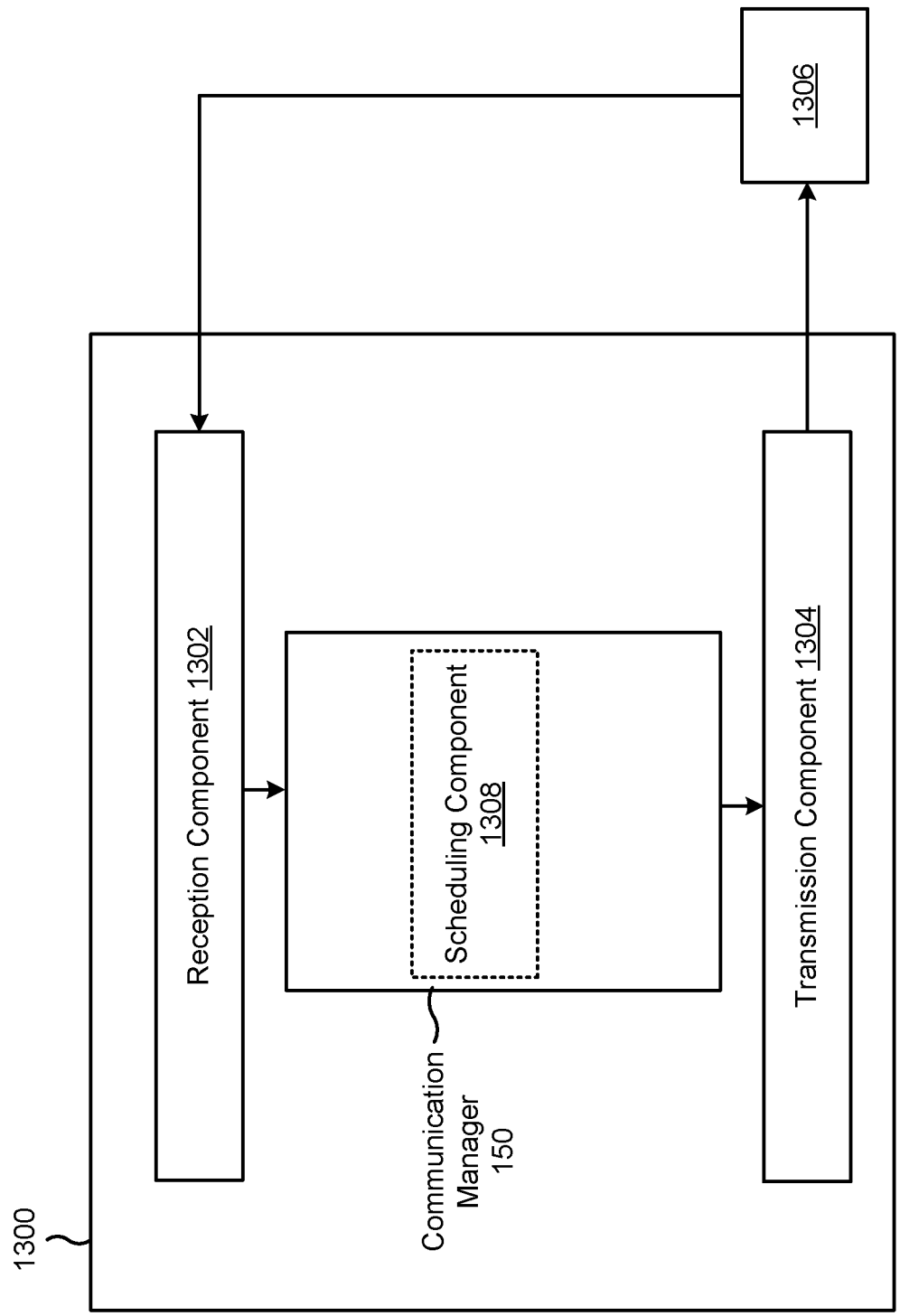

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a scheduling component 1308.

In some aspects, the apparatus 1300 may be configured to perform one or more operations described herein in connection with FIGS. 8-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a UE, a configuration of a first HARQ-ACK codebook and a second HARQ-ACK codebook, wherein the configuration indicates that PUCCH carrier switching is enabled for at least one of the first HARQ-ACK codebook or the second HARQ-ACK codebook. The transmission component 1304 may transmit, to the UE, an indication of a PUCCH carrier switch for the at least one of the first HARQ-ACK codebook or the second HARQ-ACK codebook. The transmission component 1304 may transmit, to the UE, at least one downlink communication associated with the at least one of the first HARQ-ACK codebook or the second HARQ-ACK codebook. The reception component 1302 may receive, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

The scheduling component 1308 may refrain from scheduling a transmission of first HARQ feedback for the first downlink communication and a transmission, by the UE, of second HARQ feedback for the second downlink communication in overlapping slots or sub-slots in which the second target PUCCH carrier is different from the first target PUCCH carrier.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a configuration of a first hybrid automatic repeat request acknowledgement (HARQ-ACK) codebook and a second HARQ-ACK codebook, wherein the configuration indicates that physical uplink control channel (PUCCH) carrier switching is enabled for at least one of the first HARQ-ACK codebook or the second HARQ-ACK codebook; receiving an indication of a PUCCH carrier switch for the at least one of the first HARQ-ACK codebook or the second HARQ-ACK codebook; receiving at least one downlink communication associated with the at least one of the first HARQ-ACK codebook or the second HARQ-ACK codebook; and transmitting HARQ feedback for the at least one downlink communication in the at least one of the first HARQ-ACK codebook or the second HARQ-ACK codebook on a target PUCCH carrier based at least in part on the indication of the PUCCH carrier switch.

Aspect 2: The method of Aspect 1, wherein the configuration indicates that PUCCH carrier switching is enabled for the first HARQ-ACK codebook and the second HARQ-ACK codebook.

Aspect 3: The method of any of Aspects 1-2, wherein the configuration includes a joint indication that PUCCH carrier switching is enabled for both the first HARQ-ACK codebook and the second HARQ-ACK codebook.

Aspect 4: The method of any of Aspects 1-3, wherein receiving the indication of the PUCCH carrier switch for the at least one of the first HARQ-ACK codebook or the second HARQ-ACK codebook comprises: receiving a configuration of a time pattern for switching the target PUCCH carrier between a first carrier and a second carrier, wherein the time pattern applies to the first HARQ-ACK codebook and the second HARQ-ACK codebook.

Aspect 5: The method of any of Aspects 1-3, wherein receiving the indication of the PUCCH carrier switch for the at least one of the first HARQ-ACK codebook or the second HARQ-ACK codebook comprises: receiving a first configuration of a first time pattern for switching a first target PUCCH carrier associated with the first HARQ-ACK codebook and a second configuration of a second time pattern for switching a second target PUCCH carrier associated with the second HARQ-ACK codebook.

Aspect 6: The method of any of Aspects 1-3, wherein receiving the indication of the PUCCH carrier switch for the at least one of the first HARQ-ACK codebook or the second HARQ-ACK codebook comprises: receiving, in first downlink control information (DCI) that indicates a first priority associated with the first HARQ-ACK codebook, a first indication of a first target PUCCH carrier to be used to transmit the first HARQ-ACK codebook.

Aspect 7: The method of Aspect 6, wherein receiving the indication of the PUCCH carrier switch for the at least one of the first HARQ-ACK codebook or the second HARQ-ACK codebook further comprises: receiving, in second DCI that indicates a second priority associated with the second HARQ-ACK codebook, a second indication of a second target PUCCH carrier to be used to transmit the second HARQ-ACK codebook.

Aspect 8: The method of any of Aspects 1-3, wherein receiving the indication of the PUCCH carrier switch for the at least one of the first HARQ-ACK codebook or the second HARQ-ACK codebook comprises: receiving an indication of the target PUCCH carrier in downlink control information (DCI) that indicates a first priority associated with the first HARQ-ACK codebook, wherein the indication of the target PUCCH carrier applies to the first HARQ-ACK codebook and the second HARQ-ACK codebook.

Aspect 9: The method of any of Aspects 1-3, wherein receiving the indication of the PUCCH carrier switch for the at least one of the first HARQ-ACK codebook or the second HARQ-ACK codebook comprises: receiving an indication of the target PUCCH carrier in downlink control information (DCI) that indicates a first priority associated with the first HARQ-ACK codebook, wherein: the indication of the target PUCCH carrier applies to the first HARQ-ACK codebook and the second HARQ-ACK codebook in connection with the first HARQ-ACK codebook and the second HARQ-ACK codebook having a same slot configuration, or the indication of the target PUCCH carrier applies to the first HARQ-ACK codebook and not to the second HARQ-ACK codebook in connection with the first HARQ-ACK codebook and the second HARQ-ACK codebook having different slot configurations.

Aspect 10: The method of any of Aspects 1-2 and 4-9, wherein the configuration indicates whether the PUCCH carrier switching is enabled for a single one of the first HARQ-ACK codebook or the second HARQ-ACK codebook, or the PUCCH carrier switching is enabled for both of the first HARQ-ACK codebook and the second HARQ-ACK codebook.

Aspect 11: The method of any of Aspects 1 and 4-10, wherein the configuration indicates that the PUCCH carrier switching is enabled for the first HARQ-ACK codebook and not enabled for the second HARQ-ACK codebook.

Aspect 12: The method of any of Aspects 1-11, wherein the target PUCCH carrier includes at least one of a first target PUCCH carrier associated with the first HARQ-ACK codebook or a second target PUCCH carrier associated with the second HARQ-ACK codebook, wherein the first target PUCCH carrier is a primary cell of a PUCCH group or a PUCCH secondary cell of the PUCCH group, and wherein the second target PUCCH carrier is the primary cell of the PUCCH group or the PUCCH secondary cell of the PUCCH group.

Aspect 13: The method of any of Aspects 1-11, wherein the target PUCCH carrier includes at least one of a first target PUCCH carrier associated with the first HARQ-ACK codebook or a second target PUCCH carrier associated with the second HARQ-ACK codebook, wherein the first target PUCCH carrier is a primary cell of a PUCCH group or a first PUCCH secondary cell of the PUCCH group, and wherein the second target PUCCH carrier is the primary cell of the PUCCH group or a second PUCCH secondary cell of the PUCCH group.

Aspect 14: The method of any of Aspects 1-13, wherein receiving the at least one downlink communication comprises: receiving a first downlink communication associated with the first HARQ-ACK codebook; and receiving a second downlink communication associated with the second HARQ-ACK codebook.

Aspect 15: The method of Aspect 14, wherein the indication includes a first indication of a first target PUCCH carrier associated with the first HARQ-ACK codebook and a second indication of a second target PUCCH carrier associated with the second HARQ-ACK codebook, and wherein a transmission of first HARQ feedback for the first downlink communication and a transmission of second HARQ feedback for the second downlink communication are scheduled in overlapping slots or sub-slots.

Aspect 16: The method of Aspect 15, further comprising: detecting an error condition in connection with the transmission of the first HARQ feedback and the transmission of the second HARQ feedback being scheduled in the overlapping slots or sub-slots and the second target PUCCH carrier being different from the first target PUCCH carrier in the overlapping slots or sub-slots.

Aspect 17: The method of Aspect 15, wherein the first HARQ-ACK codebook is associated with a first priority and the second HARQ-ACK codebook is associated with a second priority that is lower than the first priority, and wherein transmitting the HARQ feedback comprises: transmitting the first HARQ feedback on the first target PUCCH carrier; and refraining from transmitting the second HARQ feedback, in connection with the second target PUCCH carrier being different from the first target PUCCH carrier in the overlapping slots or sub-slots.

Aspect 18: The method of Aspect 15, wherein the first HARQ-ACK codebook is associated with a first priority and the second HARQ-ACK codebook is associated with a second priority that is lower than the first priority, and wherein transmitting the HARQ feedback comprises: transmitting the first HARQ feedback and the second HARQ feedback on the first target PUCCH carrier, in connection with the second target PUCCH being different from the first target PUCCH carrier in the overlapping slots or sub-slots.

Aspect 19: The method of any of Aspects 1-18, wherein receiving the indication of the PUCCH carrier switch for the at least one of the first HARQ-ACK codebook or the second HARQ-ACK codebook comprises: receiving first downlink control information (DCI) that indicates a first target PUCCH carrier for a transmission of first HARQ feedback in the first HARQ-ACK codebook; and receiving second DCI that indicates a second target PUCCH carrier for a transmission of second HARQ feedback in the second HARQ-ACK codebook, wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

Aspect 20: The method of any of Aspects 1-10 and 12-19, wherein the configuration indicates that PUCCH carrier switching is enabled for the first HARQ-ACK codebook and the second HARQ-ACK codebook, and wherein the first HARQ-ACK codebook and the second HARQ-ACK codebook are both slot based HARQ-ACK codebooks or sub-slot based HARQ-ACK codebooks.

Aspect 21: The method of Aspect 20, wherein the first HARQ-ACK codebook and the second HARQ-ACK codebooks are both sub-slot based HARQ-ACK codebooks with a same sub-slot length configuration.

Aspect 22: The method of any of Aspects 1-10 and 12-21, wherein receiving the indication of the PUCCH carrier switch for the at least one of the first HARQ-ACK codebook or the second HARQ-ACK codebook comprises: receiving a first indication of the PUCCH carrier switch for the first HARQ-ACK codebook and a second indication of the PUCCH carrier switch for the second HARQ-ACK codebook, wherein the first indication and the second indication are both dynamic indications or both semi-static indications.

Aspect 23: The method of any of Aspects 1-10 and 12-21, wherein receiving the indication of the PUCCH carrier switch for the at least one of the first HARQ-ACK codebook or the second HARQ-ACK codebook comprises: receiving a first indication of the PUCCH carrier switch for the first HARQ-ACK codebook and a second indication of the PUCCH carrier switch for the second HARQ-ACK codebook, wherein the first indication is a semi-static indication and the second indication is a dynamic indication.

Aspect 24: A method of wireless communication performed by a base station, comprising: transmitting, to a user equipment (UE), a configuration of a first hybrid automatic repeat request acknowledgement (HARQ-ACK) codebook and a second HARQ-ACK codebook, wherein the configuration indicates that physical uplink control channel (PUCCH) carrier switching is enabled for at least one of the first HARQ-ACK codebook or the second HARQ-ACK codebook; transmitting, to the UE, an indication of a PUCCH carrier switch for the at least one of the first HARQ-ACK codebook or the second HARQ-ACK codebook; transmitting, to the UE, at least one downlink communication associated with the at least one of the first HARQ-ACK codebook or the second HARQ-ACK codebook; and receiving, from the UE, HARQ feedback for the at least one downlink communication in the at least one of the first HARQ-ACK codebook or the second HARQ-ACK codebook on a target PUCCH carrier based at least in part on the indication of the PUCCH carrier switch.

Aspect 25: The method of Aspect 24, wherein the configuration indicates that PUCCH carrier switching is enabled for the first HARQ-ACK codebook and the second HARQ-ACK codebook.

Aspect 26: The method of any of Aspects 24-25, wherein the configuration includes a joint indication that PUCCH carrier switching is enabled for both the first HARQ-ACK codebook and the second HARQ-ACK codebook.

Aspect 27: The method of any of Aspects 24-26, wherein transmitting the indication of the PUCCH carrier switch for the at least one of the first HARQ-ACK codebook or the second HARQ-ACK codebook comprises: transmitting, to the UE, a configuration of a time pattern for switching the target PUCCH carrier between a first carrier and a second carrier, wherein the time pattern applies to the first HARQ-ACK codebook and the second HARQ-ACK codebook.

Aspect 28: The method of any of Aspects 24-26, wherein transmitting the indication of the PUCCH carrier switch for the at least one of the first HARQ-ACK codebook or the second HARQ-ACK codebook comprises: transmitting, to the UE, a first configuration of a first time pattern for switching a first target PUCCH carrier associated with the first HARQ-ACK codebook and a second configuration of a second time pattern for switching a second target PUCCH carrier associated with the second HARQ-ACK codebook.

Aspect 29: The method of any of Aspects 24-26, wherein transmitting the indication of the PUCCH carrier switch for the at least one of the first HARQ-ACK codebook or the second HARQ-ACK codebook comprises: transmitting, to the UE in first downlink control information that indicates a first priority associated with the first HARQ-ACK codebook, a first indication of a first target PUCCH carrier to be used to transmit the first HARQ-ACK codebook.

Aspect 30: The method of Aspect 29, wherein transmitting the indication of the PUCCH carrier switch for the at least one of the first HARQ-ACK codebook or the second HARQ-ACK codebook further comprises: transmitting, to the UE in second DCI that indicates a second priority associated with the second HARQ-ACK codebook, a second indication of a second target PUCCH carrier to be used to transmit the second HARQ-ACK codebook.

Aspect 31: The method of any of Aspects 24-26, wherein transmitting the indication of the PUCCH carrier switch for the at least one of the first HARQ-ACK codebook or the second HARQ-ACK codebook comprises: transmitting, to the UE, an indication of the target PUCCH carrier in downlink control information (DCI) that indicates a first priority associated with the first HARQ-ACK codebook, wherein the indication of the target PUCCH carrier applies to the first HARQ-ACK codebook and the second HARQ-ACK codebook.

Aspect 32: The method of any of Aspects 24-26, wherein transmitting the indication of the PUCCH carrier switch for the at least one of the first HARQ-ACK codebook or the second HARQ-ACK codebook comprises: transmitting, to the UE, an indication of the target PUCCH carrier in downlink control information (DCI) that indicates a first priority associated with the first HARQ-ACK codebook, wherein: the indication of the target PUCCH carrier applies to the first HARQ-ACK codebook and the second HARQ-ACK codebook in connection with the first HARQ-ACK codebook and the second HARQ-ACK codebook having a same slot configuration, or the indication of the target PUCCH carrier applies to the first HARQ-ACK codebook and not to the second HARQ-ACK codebook in connection with the first HARQ-ACK codebook and the second HARQ-ACK codebook having different slot configurations.

Aspect 33: The method of any of Aspects 24-25 and 27-32, wherein the configuration indicates whether the PUCCH carrier switching is enabled for a single one of the first HARQ-ACK codebook or the second HARQ-ACK codebook, or the PUCCH carrier switching is enabled for both of the first HARQ-ACK codebook and the second HARQ-ACK codebook.

Aspect 34: The method of any of Aspects 24 and 27-33, wherein the configuration indicates that the PUCCH carrier switching is enabled for the first HARQ-ACK codebook and not enabled for the second HARQ-ACK codebook.

Aspect 35: The method of any of Aspects 24-33, wherein the target PUCCH carrier includes at least one of a first target PUCCH carrier associated with the first HARQ-ACK codebook or a second target PUCCH carrier associated with the second HARQ-ACK codebook, wherein the first target PUCCH carrier is a primary cell of a PUCCH group or a PUCCH secondary cell of the PUCCH group, and wherein the second target PUCCH carrier is the primary cell of the PUCCH group or the PUCCH secondary cell of the PUCCH group.

Aspect 36: The method of any of Aspects 24-33, wherein the target PUCCH carrier includes at least one of a first target PUCCH carrier associated with the first HARQ-ACK codebook or a second target PUCCH carrier associated with the second HARQ-ACK codebook, wherein the first target PUCCH carrier is a primary cell of a PUCCH group or a first PUCCH secondary cell of the PUCCH group, and wherein the second target PUCCH carrier is the primary cell of the PUCCH group or a second PUCCH secondary cell of the PUCCH group.

Aspect 37: The method of any of Aspects 24-36, wherein transmitting the at least one downlink communication comprises: transmitting, to the UE, a first downlink communication associated with the first HARQ-ACK codebook; and transmitting, to the UE, a second downlink communication associated with the second HARQ-ACK codebook.

Aspect 38: The method of Aspect 37, wherein the indication includes a first indication of a first target PUCCH carrier associated with the first HARQ-ACK codebook and a second indication of a second target PUCCH carrier associated with the second HARQ-ACK codebook, and wherein the method further comprises: refraining from scheduling a transmission, by the UE, of first HARQ feedback for the first downlink communication and a transmission, by the UE, of second HARQ feedback for the second downlink communication in overlapping slots or sub-slots in which the second target PUCCH carrier is different from the first target PUCCH carrier.

Aspect 39: The method of any of Aspects 24-38, wherein transmitting the indication of the PUCCH carrier switch for the at least one of the first HARQ-ACK codebook or the second HARQ-ACK codebook comprises: transmitting, to the UE, first downlink control information (DCI) that indicates a first target PUCCH carrier for a transmission of first HARQ feedback in the first HARQ-ACK codebook; and transmitting, to the UE, second DCI that indicates a second target PUCCH carrier for transmission of second HARQ feedback in the second HARQ-ACK codebook, wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

Aspect 40: The method of any of Aspects 24-33 and 35-39, wherein the configuration indicates that PUCCH carrier switching is enabled for the first HARQ-ACK codebook and the second HARQ-ACK codebook, and wherein the first HARQ-ACK codebook and the second HARQ-ACK codebook are both slot based HARQ-ACK codebooks or sub-slot based HARQ-ACK codebooks.

Aspect 41: The method of Aspect 40, wherein the first HARQ-ACK codebook and the second HARQ-ACK codebooks are both sub-slot based HARQ-ACK codebooks with a same sub-slot length configuration.

Aspect 42: The method of any of Aspects 24-33 and 35-41, wherein transmitting the indication of the PUCCH carrier switch for the at least one of the first HARQ-ACK codebook or the second HARQ-ACK codebook comprises: transmitting, to the UE, a first indication of the PUCCH carrier switch for the first HARQ-ACK codebook and a second indication of the PUCCH carrier switch for the second HARQ-ACK codebook, wherein the first indication and the second indication are both dynamic indications or both semi-static indications.

Aspect 43: The method of any of Aspects 24-33 and 35-41, wherein transmitting the indication of the PUCCH carrier switch for the at least one of the first HARQ-ACK codebook or the second HARQ-ACK codebook comprises: transmitting, to the UE, a first indication of the PUCCH carrier switch for the first HARQ-ACK codebook and a second indication of the PUCCH carrier switch for the second HARQ-ACK codebook, wherein the first indication is a semi-static indication and the second indication is a dynamic indication.

Aspect 44: An apparatus for wireless communication at a device, comprising a processor; memory coupled with the processor; and instructions stored in the memory and executable by the processor to cause the apparatus to perform the method of one or more of Aspects 1-23.

Aspect 45: A device for wireless communication, comprising a memory and one or more processors coupled to the memory, the one or more processors configured to perform the method of one or more of Aspects 1-23.

Aspect 46: An apparatus for wireless communication, comprising at least one means for performing the method of one or more of Aspects 1-23.

Aspect 47: A non-transitory computer-readable medium storing code for wireless communication, the code comprising instructions executable by a processor to perform the method of one or more of Aspects 1-23.

Aspect 48: A non-transitory computer-readable medium storing a set of instructions for wireless communication, the set of instructions comprising one or more instructions that, when executed by one or more processors of a device, cause the device to perform the method of one or more of Aspects 1-23.

Aspect 49: An apparatus for wireless communication at a device, comprising a processor; memory coupled with the processor; and instructions stored in the memory and executable by the processor to cause the apparatus to perform the method of one or more of Aspects 24-43.

Aspect 50: A device for wireless communication, comprising a memory and one or more processors coupled to the memory, the one or more processors configured to perform the method of one or more of Aspects 24-43.

Aspect 51: An apparatus for wireless communication, comprising at least one means for performing the method of one or more of Aspects 24-43.

Aspect 52: A non-transitory computer-readable medium storing code for wireless communication, the code comprising instructions executable by a processor to perform the method of one or more of Aspects 24-43.

Aspect 53: A non-transitory computer-readable medium storing a set of instructions for wireless communication, the set of instructions comprising one or more instructions that, when executed by one or more processors of a device, cause the device to perform the method of one or more of Aspects 24-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, individually or collectively configured to:
        receive a configuration of a first hybrid automatic repeat request acknowledgement (HARQ-ACK) codebook and a second HARQ-ACK codebook,
            wherein the configuration of the first HARQ-ACK codebook and the second HARQ-ACK codebook indicates that physical uplink control channel (PUCCH) carrier switching is enabled for at least one of the first HARQ-ACK codebook or the second HARQ-ACK codebook;
        receive an indication of a PUCCH carrier switch for the at least one of the first HARQ-ACK codebook or the second HARQ-ACK codebook,
            wherein the one or more processors, to receive the indication of the PUCCH carrier switch, are configured to:
                receive a configuration of a time pattern for switching a target PUCCH carrier between a first carrier and a second carrier, wherein the time pattern applies to the first HARQ-ACK codebook and the second HARQ-ACK codebook;
        receive at least one downlink communication associated with the at least one of the first HARQ-ACK codebook or the second HARQ-ACK codebook; and
        transmit HARQ feedback for the at least one downlink communication in the at least one of the first HARQ-ACK codebook or the second HARQ-ACK codebook on the target PUCCH carrier based at least in part on the indication of the PUCCH carrier switch.

2. The UE of claim 1, wherein the configuration of the first HARQ-ACK codebook and the second HARQ-ACK codebook indicates that the PUCCH carrier switching is enabled for the first HARQ-ACK codebook and the second HARQ-ACK codebook.

3. The UE of claim 1, wherein the one or more processors, to receive the indication of the PUCCH carrier switch, are configured to:
    receive, in first downlink control information (DCI) that indicates a first priority associated with the first HARQ- ACK codebook, a first indication of a first target PUCCH carrier to be used to transmit the first HARQ-ACK codebook.

4. The UE of claim 3, wherein the one or more processors, to receive the indication of the PUCCH carrier switch, are configured to:
receive, in second DCI that indicates a second priority associated with the second HARQ-ACK codebook, a second indication of a second target PUCCH carrier to be used to transmit the second HARQ-ACK codebook.

5. The UE of claim 1, wherein the configuration of the first HARQ-ACK codebook and the second HARQ-ACK codebook indicates whether the PUCCH carrier switching is enabled for a single one of the first HARQ-ACK codebook or the second HARQ-ACK codebook, or whether the PUCCH carrier switching is enabled for both the first HARQ-ACK codebook and the second HARQ-ACK codebook.

6. The UE of claim 1, wherein the configuration of the first HARQ-ACK codebook and the second HARQ-ACK codebook indicates that the PUCCH carrier switching is enabled for the first HARQ-ACK codebook and not enabled for the second HARQ-ACK codebook.

7. The UE of claim 1, wherein the target PUCCH carrier includes at least one of a first target PUCCH carrier associated with the first HARQ-ACK codebook or a second target PUCCH carrier associated with the second HARQ-ACK codebook,
wherein the first target PUCCH carrier is a primary cell of a PUCCH group or a PUCCH secondary cell of the PUCCH group, and
wherein the second target PUCCH carrier is the primary cell of the PUCCH group or the PUCCH secondary cell of the PUCCH group.

8. The UE of claim 1, wherein the one or more processors, to receive the indication of the PUCCH carrier switch, are configured to:
receive first downlink control information (DCI) that indicates a first target PUCCH carrier for a transmission of first HARQ feedback in the first HARQ-ACK codebook; and
receive second DCI that indicates a second target PUCCH carrier for a transmission of second HARQ feedback in the second HARQ-ACK codebook,
wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

9. The UE of claim 1, wherein the one or more processors, to receive the indication of the PUCCH carrier switch, are configured to:
receive a first indication of the PUCCH carrier switch for the first HARQ-ACK codebook and a second indication of the PUCCH carrier switch for the second HARQ-ACK codebook, wherein the first indication and the second indication are both dynamic indications or both semi-static indications.

10. A network entity for wireless communication, comprising:
one or more memories; and
one or more processors, coupled to the one or more memories, individually or collectively configured to:
transmit, to a user equipment (UE), a configuration of a first hybrid automatic repeat request acknowledgement (HARQ-ACK) codebook and a second HARQ-ACK codebook,
wherein the configuration of the first HARQ-ACK codebook and the second HARQ-ACK codebook indicates that physical uplink control channel (PUCCH) carrier switching is enabled for at least one of the first HARQ-ACK codebook or the second HARQ-ACK codebook;
transmit, to the UE, an indication of a PUCCH carrier switch for the at least one of the first HARQ-ACK codebook or the second HARQ-ACK codebook,
wherein the one or more processors, to transmit, to the UE, the indication of the PUCCH carrier switch, are configured to:
transmit, to the UE, a configuration of a time pattern for switching a target PUCCH carrier between a first carrier and a second carrier, wherein the time pattern applies to the first HARQ-ACK codebook and the second HARQ-ACK codebook;
transmit, to the UE, at least one downlink communication associated with the at least one of the first HARQ-ACK codebook or the second HARQ-ACK codebook; and
receive, from the UE, HARQ feedback for the at least one downlink communication in the at least one of the first HARQ-ACK codebook or the second HARQ-ACK codebook on the target PUCCH carrier based at least in part on the indication of the PUCCH carrier switch.

11. The network entity of claim 10, wherein the configuration of the first HARQ-ACK codebook and the second HARQ-ACK codebook indicates that the PUCCH carrier switching is enabled for the first HARQ-ACK codebook and the second HARQ-ACK codebook.

12. The network entity of claim 10, wherein the one or more processors, to transmit the indication of the PUCCH carrier switch, are configured to:
transmit, to the UE in first downlink control information (DCI) that indicates a first priority associated with the first HARQ-ACK codebook, a first indication of a first target PUCCH carrier to be used to transmit the first HARQ-ACK codebook.

13. The network entity of claim 12, wherein the one or more processors, to transmit the indication of the PUCCH carrier switch, are configured to:
transmit, to the UE in second DCI that indicates a second priority associated with the second HARQ-ACK codebook, a second indication of a second target PUCCH carrier to be used to transmit the second HARQ-ACK codebook.

14. The network entity of claim 10, wherein the configuration of the first HARQ-ACK codebook and the second HARQ-ACK codebook indicates whether the PUCCH carrier switching is enabled for a single one of the first HARQ-ACK codebook or the second HARQ-ACK codebook, or whether the PUCCH carrier switching is enabled for both the first HARQ-ACK codebook and the second HARQ-ACK codebook.

15. The network entity of claim 10, wherein the configuration of the first HARQ-ACK codebook and the second HARQ-ACK codebook indicates that the PUCCH carrier switching is enabled for the first HARQ-ACK codebook and is not enabled for the second HARQ-ACK codebook.

16. The network entity of claim 10, wherein the target PUCCH carrier includes at least one of a first target PUCCH carrier associated with the first HARQ-ACK codebook or a second target PUCCH carrier associated with the second HARQ-ACK codebook,
 wherein the first target PUCCH carrier is a primary cell of a PUCCH group or a PUCCH secondary cell of the PUCCH group, and
 wherein the second target PUCCH carrier is the primary cell of the PUCCH group or the PUCCH secondary cell of the PUCCH group.

17. The network entity of claim 10, wherein the one or more processors, to transmit the indication of the PUCCH carrier switch, are configured to:
 transmit, to the UE, first downlink control information (DCI) that indicates a first target PUCCH carrier for a transmission of first HARQ feedback in the first HARQ-ACK codebook; and
 transmit, to the UE, second DCI that indicates a second target PUCCH carrier for a transmission of second HARQ feedback in the second HARQ-ACK codebook,
 wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

18. A method of wireless communication performed by a user equipment (UE), comprising:
 receiving a configuration of a first hybrid automatic repeat request acknowledgement (HARQ-ACK) codebook and a second HARQ-ACK codebook,
  wherein the configuration of the first HARQ-ACK codebook and the second HARQ-ACK codebook indicates that physical uplink control channel (PUCCH) carrier switching is enabled for at least one of the first HARQ-ACK codebook or the second HARQ-ACK codebook;
 receiving an indication of a PUCCH carrier switch for the at least one of the first HARQ-ACK codebook or the second HARQ-ACK codebook,
  wherein receiving the indication of the PUCCH carrier switch comprises:
   receiving a configuration of a time pattern for switching a target PUCCH carrier between a first carrier and a second carrier, wherein the time pattern applies to the first HARQ-ACK codebook and the second HARQ-ACK codebook;
 receiving at least one downlink communication associated with the at least one of the first HARQ-ACK codebook or the second HARQ-ACK codebook; and
 transmitting HARQ feedback for the at least one downlink communication in the at least one of the first HARQ-ACK codebook or the second HARQ-ACK codebook on the target PUCCH carrier based at least in part on the indication of the PUCCH carrier switch.

19. The method of claim 18, wherein the configuration of the first HARQ-ACK codebook and the second HARQ-ACK codebook indicates that the PUCCH carrier switching is enabled for the first HARQ-ACK codebook and the second HARQ-ACK codebook.

20. The method of claim 18, wherein receiving the indication of the PUCCH carrier switch comprises:
 receiving, in first downlink control information (DCI) that indicates a first priority associated with the first HARQ-ACK codebook, a first indication of a first target PUCCH carrier to be used to transmit the first HARQ-ACK codebook.

21. The method of claim 20, wherein receiving the indication of the PUCCH carrier switch further comprises:
 receiving, in second DCI that indicates a second priority associated with the second HARQ-ACK codebook, a second indication of a second target PUCCH carrier to be used to transmit the second HARQ-ACK codebook.

22. The method of claim 18, wherein the configuration of the first HARQ-ACK codebook and the second HARQ-ACK codebook indicates whether the PUCCH carrier switching is enabled for a single one of the first HARQ-ACK codebook or the second HARQ-ACK codebook, or whether the PUCCH carrier switching is enabled for both the first HARQ-ACK codebook and the second HARQ-ACK codebook.

23. The method of claim 18, wherein the configuration of the first HARQ-ACK codebook and the second HARQ-ACK codebook indicates that the PUCCH carrier switching is enabled for the first HARQ-ACK codebook and not enabled for the second HARQ-ACK codebook.

24. The method of claim 18, wherein receiving the indication of the PUCCH carrier switch comprises:
 receiving first downlink control information (DCI) that indicates a first target PUCCH carrier for a transmission of first HARQ feedback in the first HARQ-ACK codebook; and
 receiving second DCI that indicates a second target PUCCH carrier for a transmission of second HARQ feedback in the second HARQ-ACK codebook,
  wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

25. A method of wireless communication performed by a network entity, comprising:
 transmitting, to a user equipment (UE), a configuration of a first hybrid automatic repeat request acknowledgement (HARQ-ACK) codebook and a second HARQ-ACK codebook,
  wherein the configuration of the first HARQ-ACK codebook and the second HARQ-ACK codebook indicates that physical uplink control channel (PUCCH) carrier switching is enabled for at least one of the first HARQ-ACK codebook or the second HARQ-ACK codebook;
 transmitting, to the UE, an indication of a PUCCH carrier switch for the at least one of the first HARQ-ACK codebook or the second HARQ-ACK codebook,
  wherein transmitting, to the UE, the indication of the PUCCH carrier switch comprises:
   transmitting, to the UE, a configuration of a time pattern for switching a target PUCCH carrier between a first carrier and a second carrier, wherein the time pattern applies to the first HARQ-ACK codebook and the second HARQ-ACK codebook;
 transmitting, to the UE, at least one downlink communication associated with the at least one of the first HARQ-ACK codebook or the second HARQ-ACK codebook; and
 receiving, from the UE, HARQ feedback for the at least one downlink communication in the at least one of the first HARQ-ACK codebook or the second HARQ-ACK codebook on the target PUCCH carrier based at least in part on the indication of the PUCCH carrier switch.

26. The method of claim 18, wherein the target PUCCH carrier includes at least one of a first target PUCCH carrier associated with the first HARQ-ACK codebook or a second target PUCCH carrier associated with the second HARQ-ACK codebook,
   wherein the first target PUCCH carrier is a primary cell of a PUCCH group or a PUCCH secondary cell of the PUCCH group, and
   wherein the second target PUCCH carrier is the primary cell of the PUCCH group or the PUCCH secondary cell of the PUCCH group.

27. The method of claim 25, wherein transmitting the indication of the PUCCH carrier switch comprises at least one of:
   transmitting, to the UE in first downlink control information (DCI) that indicates a first priority associated with the first HARQ-ACK codebook, a first indication of a first target PUCCH carrier to be used to transmit the first HARQ-ACK codebook; or
   transmitting, to the UE in second DCI that indicates a second priority associated with the second HARQ-ACK codebook, a second indication of a second target PUCCH carrier to be used to transmit the second HARQ-ACK codebook.

28. The method of claim 25, wherein the configuration of the first HARQ-ACK codebook and the second HARQ-ACK codebook indicates whether the PUCCH carrier switching is enabled for a single one of the first HARQ-ACK codebook or the second HARQ-ACK codebook, or whether the PUCCH carrier switching is enabled for both of the first HARQ-ACK codebook and the second HARQ-ACK codebook.

29. The method of claim 25, wherein the target PUCCH carrier includes at least one of a first target PUCCH carrier associated with the first HARQ-ACK codebook or a second target PUCCH carrier associated with the second HARQ-ACK codebook,
   wherein the first target PUCCH carrier is a primary cell of a PUCCH group or a PUCCH secondary cell of the PUCCH group, and
   wherein the second target PUCCH carrier is the primary cell of the PUCCH group or the PUCCH secondary cell of the PUCCH group.

30. The method of claim 25, wherein transmitting the indication of the PUCCH carrier switch comprises:
   transmitting, to the UE, first downlink control information (DCI) that indicates a first target PUCCH carrier for a transmission of first HARQ feedback in the first HARQ-ACK codebook; and
   transmitting, to the UE, second DCI that indicates a second target PUCCH carrier for a transmission of second HARQ feedback in the second HARQ-ACK codebook,
      wherein the second DCI schedules the transmission of the second HARQ feedback in a different slot or sub-slot from the transmission of the first HARQ feedback or wherein the second target PUCCH carrier indicated by the second DCI is a same PUCCH carrier as the first target PUCCH carrier indicated by the first DCI.

* * * * *